United States Patent
Doi et al.

(10) Patent No.: US 6,765,529 B2
(45) Date of Patent: Jul. 20, 2004

(54) CALIBRATION DEVICE, ADAPTIVE ARRAY DEVICE, CALIBRATION METHOD, PROGRAM RECORDING MEDIUM AND PROGRAM

(75) Inventors: Yoshiharu Doi, Gifu (JP); Seigo Nakao, Gifu (JP); Takaaki Makita, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 15 days.

(21) Appl. No.: 10/332,326

(22) PCT Filed: Jul. 12, 2001

(86) PCT No.: PCT/JP01/06069

§ 371 (c)(1),
(2), (4) Date: Jan. 7, 2003

(87) PCT Pub. No.: WO02/07343

PCT Pub. Date: Jan. 24, 2002

(65) Prior Publication Data

US 2003/0176166 A1 Sep. 18, 2003

(30) Foreign Application Priority Data

Jul. 14, 2000 (JP) ......................................... 2000-215101

(51) Int. Cl.⁷ ................................................. H01Q 3/22
(52) U.S. Cl. ..................................................... 342/368
(58) Field of Search .................................. 342/165, 173, 342/174, 368, 372, 374

(56) References Cited

U.S. PATENT DOCUMENTS

| | | | | |
|---|---|---|---|---|
| 6,400,318 B1 | * | 6/2002 | Kasami et al. | 342/383 |
| 6,486,828 B1 | * | 11/2002 | Cahn et al. | 342/363 |
| 6,496,142 B1 | * | 12/2002 | Iinuma | 342/368 |
| 6,498,804 B1 | * | 12/2002 | Ide et al. | 375/144 |
| 2001/0016504 A1 | * | 8/2001 | Dam et al. | 455/562 |

FOREIGN PATENT DOCUMENTS

| | | |
|---|---|---|
| EP | 954053 | 11/1999 |
| JP | 11-8507 | 1/1999 |

* cited by examiner

Primary Examiner—Dao Phan

(57) ABSTRACT

Transmit a desired signal from a first antenna, and an interference signal from a second antenna, and calculate a weight vector by which the interference signal can be eliminated and the desired signal can be array-received by a third antenna and a fourth antenna. While having the third antenna and the fourth antenna array-transmit signals using the weight vector calculated, fluctuate the phase amount and the amplitude amount of the signals transmitted by the fourth antenna, so as to calculate a correction value from the phase amount and the amplitude amount at the time when the signal level of the signals received by the second antenna is minimum.

52 Claims, 15 Drawing Sheets

②Ant3,4:ARRAY-RECEPTION OF DESIRED SIGNAL

③Ant3,4:ARRAY-TRANSMISSION OF DESIRED SIGNAL
④Ant4:PHASE FLUCTUATION
⑤Ant4: Δθ WHEN RECEPTION LEVEL IS MINIMUM
⑥Ant4:AMPLITUDE FLUCTUATION
⑦Ant4:Amp WHEN AMPLITUDE FLUCTUATION IS MINIMUM

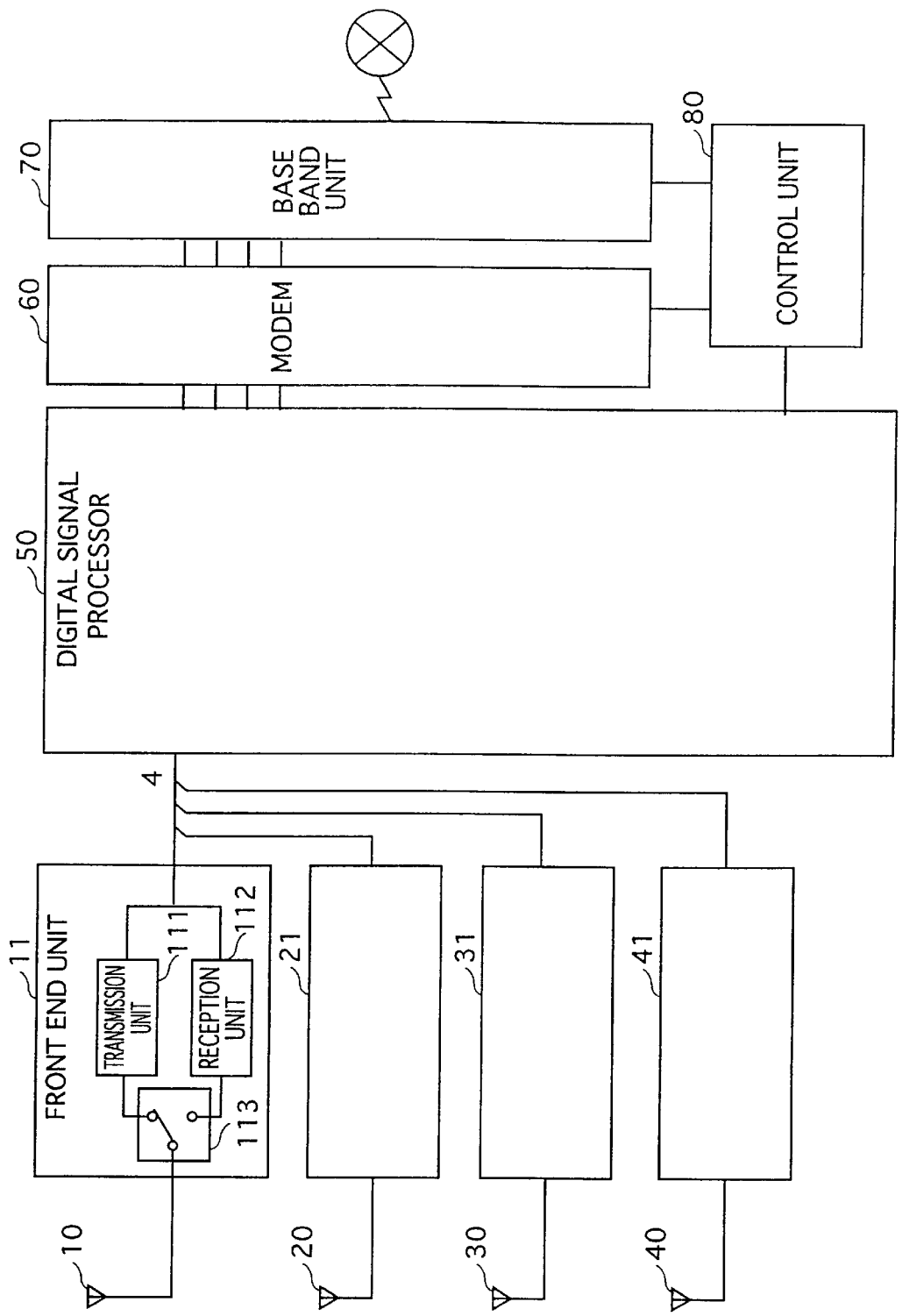

FIG.5

| | CALIBRATION PROCESS | | WHEN NOT PERFORMING CALIBRATION PROCESS |
|---|---|---|---|
| | FIRST HALF (ARRAY-RECEPTION) | SECOND HALF (ARRAY-TRANSMISSION) | |
| USER SIGNAL PROCESSING UNIT 51a | CONTROL THE TRANSMISSION OF DESIRED SIGNAL FROM Ant1 | CONTROL THE RECEPTION OF DESIRED SIGNAL AT Ant1 | CONTROL THE ARRAY-TRANSMISSION AND ARRAY-RECEPTION BY Ant1-4 |
| USER SIGNAL PROCESSING UNIT 51b | CONTROL THE TRANSMISSION OF INTERFERENCE SIGNAL FROM Ant2 | CONTROL THE RECEPTION OF INTERFERENCE SIGNAL AT Ant2 | CONTROL THE ARRAY-TRANSMISSION AND ARRAY-RECEPTION BY Ant1-4 |
| USER SIGNAL PROCESSING UNIT 51c | CONTROL THE ARRAY-RECEPTION AT Ant3 AND Ant4 | CONTROL THE ARRAY-TRANSMISSION FROM Ant3 AND Ant4 | CONTROL THE ARRAY-TRANSMISSION AND ARRAY-RECEPTION BY Ant1-4 |
| USER SIGNAL PROCESSING UNIT 51d | IDLE | IDLE | CONTROL THE ARRAY-TRANSMISSION AND ARRAY-RECEPTION BY Ant1-4 |

FIG.6

|      | CASE 1       | CASE 2       | CASE 3       | CASE 4       |
|------|--------------|--------------|--------------|--------------|
| Ant1 | RADIO UNIT 1 | RADIO UNIT 2 | RADIO UNIT 3 | RADIO UNIT 4 |
| Ant2 | RADIO UNIT 2 | RADIO UNIT 3 | RADIO UNIT 4 | RADIO UNIT 1 |
| Ant3 | RADIO UNIT 3 | RADIO UNIT 4 | RADIO UNIT 1 | RADIO UNIT 2 |
| Ant4 | RADIO UNIT 4 | RADIO UNIT 1 | RADIO UNIT 2 | RADIO UNIT 3 |

CALIBRATION DEVICE, ADAPTIVE ARRAY DEVICE, CALIBRATION METHOD, PROGRAM RECORDING MEDIUM AND PROGRAM

TECHNICAL FIELD

The present invention relates to a calibration apparatus, an adaptive array apparatus, a calibration method, a program recording medium for recording a computer-readable program, and a program, all of which are for measuring the differences of the transfer characteristics between a transmission unit and a reception unit of a plurality of radio systems within an adaptive array apparatus designed for radio communication.

BACKGROUND ART

With the recent increase in mobile stations such as PHS devices and mobile phones, there is an increasing social need for more effective use of radio wave frequency resources. An example of a communication method that addresses this need is the spatial multiplexing method.

The spatial multiplexing method is a communication method that involves the usage of an adaptive array apparatus that forms a different directivity pattern (called an adaptive array pattern) for each of a plurality of mobile stations. By doing this, the adaptive array apparatus is able to perform communication functions by multiplexing the transmission and reception signals of the plurality of mobile stations simultaneously on the same frequency.

An adaptive array apparatus includes a plurality of radio units made up of an antenna, a transmission unit, and a reception unit. And this apparatus forms directivity patterns (called array antenna patterns) for the entire antenna by adjusting the amplitudes and phases of the transmission signals and reception signals inputted to and outputted from each radio unit. More specifically, the array antenna patterns are formed by weighting the amplitudes and phases of the transmission signals and reception signals inputted to and outputted from each radio unit using a weight coefficient (also called a weight vector). The calculation of weight vectors is performed by a DSP (Digital Signal Processor) within the adaptive array apparatus.

When an adaptive array is used in a mobile phone system, the mobile phone unit has physical limitations such as size and possible number of antennas, making it impossible for the mobile phone to perform the function of controlling the directivity pattern. Therefore, it is the radio base station that forms the directivity patterns both at times of reception and times of transmission. In that case, the array antenna pattern formed by the radio base station at the time of transmission is same as the one that has been optimally formed at the time of reception.

However, even if the weight vector calculated at the time of reception is used at the time of transmission, it is not always the case that the same array antenna pattern will be formed for transmission and reception. This is due to the fact that, within each radio unit, the transfer characteristics of the transmission unit vary from those of the reception unit. These differences stem, for example, from the fact that the units are two physically separate circuits and there are variations between the characteristics of the circuit elements. In particular, this variation between the characteristics of the circuit elements come about in LNAs (Low Noise Amps) found in reception units and HPAs (High Power Amps) found in transmission units, these amps varying individually or undergoing temperature changes in certain usage environments. Due to these factors, variation comes about in the transfer characteristics such as phase rotation amounts and amplitude fluctuation amounts produced when a signal is passed through the transmission unit and the reception unit.

The differences between the transfer characteristics of reception units and transmission units have direct influences to errors in array antenna patterns at times of receiving and transmitting. For this reason, it is necessary that differences in transfer characteristics between transmission units and reception units be measured in order to perform calibration to compensate for those differences An example of such a calibration method can be found in Japanese Laid-Open Patent Application No. H11-312917, titled Array Antenna Apparatus This array antenna includes, as additional equipment, a calibration-specific desired signal generation means, a calibration-specific interference signal generation means, an electrical power control means for controlling the electrical power of the calibration-specific interference signal generation means, a combining means for combining the calibration-specific desired signal with the calibration-specific interference signal whose electrical power is controlled, and a distribution means for distributing the combined signal to the various antennas, so as to compensate for the transfer characteristics within a reception system.

This additional equipment is required within the adaptive array apparatus of the prior art to assess the difference between transfer characteristics of transmission circuits and reception circuits in each separate radio unit, causing a problem wherein the scale of the circuits are increased. In other words, the problem with the prior art is that the scales of its circuits are increased in order to include a calibration-specific circuit that would not be required in regular communication.

DISCLOSURE OF THE INVENTION

In light of the above problems, an object of the present invention is to provide a calibration apparatus, an adaptive array apparatus, a calibration method, a program recording medium and a program all of which are able to perform calibration processes without having additional equipment in the apparatus whose transfer characteristics are to be measured.

In order to achieve the above object, the present invention provides a calibration apparatus that measures a correction value for a radio terminal which, for a purpose of performing radio communication by forming an array antenna pattern, includes at least a first radio unit and a second radio unit, each made up of a transmission unit, a reception unit, and an antenna, the calibration apparatus comprising: a first antenna; a second antenna; a control means for controlling the first radio unit and the second radio unit to perform transmission of signals with an array antenna pattern being formed, using a weight vector by which a directivity is oriented toward the first antenna and a null is directed toward the second antenna; and a measuring means for measuring transfer characteristics that are relative between the first radio unit and the second radio unit on the basis of a signal level of the signals received by either the first antenna or the second antenna.

With this arrangement, it is possible to measure the relative transfer characteristics that are relative between the first radio unit and the second radio unit, on the basis of the level of the signals received by the first antenna and the second antenna, by controlling the first radio unit and the second radio unit, which are originally located in the radio terminal, to perform transmission of signals with an array antenna pattern being formed; therefore, there is an effective result that calibration can be performed without having additional calibrating equipment in the radio terminal whose transfer characteristics are to be measured.

The calibration apparatus may have an arrangement wherein the control means controls the second radio unit to fluctuate, during the transmission by the first radio unit and the second radio unit, a phase and an amplitude of the signal transmitted, and the measuring means measures a phase fluctuation amount and an amplitude fluctuation amount as the transfer characteristics on the basis of the phase and the amplitude at such a time when the signal level of the signals received by the second antenna is minimum during the fluctuation.

With this arrangement, the phase fluctuation amount and the amplitude fluctuation amount can be measured by fluctuating the phase and the amplitude of only the signals transmitted by the second radio unit during the transmission performed by the first radio unit and the second radio unit, and matching the null direction with the direction of the second antenna.

The calibration apparatus may further comprise a transmission means for transmitting, on a same frequency, a desired signal from the first antenna, and an interference signal from the second antenna, wherein the control means (i) controls the radio terminal to calculate a weight vector by which the interference signal can be eliminated and the desired signal can be received by the first radio unit and the second radio unit, and then (ii) controls the first radio unit and the second radio unit to perform the transmission of the signals using the weight vector calculated.

With this arrangement, it is possible to match accurately the null direction in the array antenna pattern at the time of reception and the null direction in the array antenna pattern at the time of transmission.

The present invention further provides an adaptive array apparatus including a plurality of radio units, each made up of a transmission unit, a reception unit, and an antenna, the adaptive array apparatus comprising:

a selecting means for selecting a radio unit among the plurality of radio units; and a control means for controlling the selected radio unit and one of unselected radio units to perform transmission of signals between each other in order to measure transfer characteristics of the selected radio unit on the basis of the signals received.

With this arrangement, the control means controls the selected radio unit and one of unselected radio units to perform transmission of signals between each other in order to measure transfer characteristics of the selected radio unit on the basis of the signals received; therefore, there is an effective result that the transfer characteristics can be measured without having an additional circuit. Furthermore, if only one radio unit is selected, the transfer characteristics of the particular radio unit can be measured, whereas, if two radio units are selected, the transfer characteristics that are relative between those two radio units (that is to say, the relative transfer characteristics) can be measured.

The adaptive array apparatus may have an arrangement wherein the selecting means selects another radio unit after the measuring by the control means, and the control means calculates a correction value for each of the radio units on the basis of the transfer characteristics measured for each of the radio units.

With this arrangement, there is an effective result that, in addition to the effect already mentioned, it is possible to measure the transfer characteristics of each radio unit, and calculate the corrections value for each radio unit from the result of measuring, since the selecting means selects each of all the radio units in turn.

The adaptive array apparatus may have an arrangement wherein the selecting means selects two radio units, the two selected radio units perform the transmission of the signals with such an array antenna pattern being formed in which a null is directed toward the antenna of one of the unselected radio units, while the two selected radio units fluctuate one or both of a phase and an amplitude at one of the two selected radio units, and the control means determines that the transfer characteristics are one or both of the phase and the amplitude at such a time when a signal level of the signals received by the radio unit toward which a null is directed is minimum during the fluctuation.

With this arrangement, there is an effective result that, in addition to the effects already mentioned, it is possible to easily measure the deviation in the array antenna patterns at the time of transmission by (i) having the selected radio units form such an array antenna pattern in which a null is directed toward the antenna of another radio unit, so as to match the null direction at the time of reception with the null direction at the time of transmission (in other words, that is when the level of the signals received is the minimum), and (ii) measuring one or both of the phase and the amplitude.

The adaptive array apparatus may have an arrangement wherein the two selected radio units form the array antenna pattern in which a null is directed toward the antenna of the unselected radio unit, by using a weight vector obtained at such a time when the two selected radio units perform an array-reception while eliminating the signal transmitted by one of the unselected radio units.

With this arrangement, there is an effective result that, in addition to the effects already mentioned, it is possible to easily form an array antenna pattern in which a null is directed by using the same weight vector at the time of array-reception for the array-transmission as well.

The present invention further provides an adaptive array apparatus including a plurality of radio units each made up of a transmission unit, a reception unit, and an antenna, the adaptive array apparatus comprising: a selecting means for selecting four radio units among the plurality of radio units as a first radio unit, a second radio unit, a third radio unit, and a fourth radio unit; and a control means for (a) controlling the third and the fourth radio units to perform an array-transmission using a weight vector by which a directivity is oriented toward the antenna of the first radio unit and a null is directed toward the antenna of the second radio unit; and (b) measuring transfer characteristics that are relative between the third radio unit and the fourth radio unit on the basis of a signal level of the signals received by either the first radio unit or the second radio unit.

With this arrangement, there is an effective result that, without having an additional circuit, it is possible to measure the relative transfer characteristics based on the level of the signals received by controlling the third radio unit and the fourth radio unit that are selected to perform an array-transmission.

The adaptive array apparatus may have an arrangement wherein the selecting means repeats selecting four radio units among the plurality of radio units, until each of all the plurality of radio units gets selected once as a fourth radio unit, and the control means calculates a correction value for each of the plurality of radio units using one of the plurality of radio units as a standard of relativity, on the basis of the transfer characteristics measured for each of the radio units.

With this arrangement, there is an effect result that, in addition to the effects already mentioned, it is possible to calculate a relative correction values for each of the radio units using one of the radio units as a standard of relativity.

The adaptive array apparatus may have an arrangement wherein the control means further judges whether the transfer characteristics are correct by checking if either a sum or a product of the transfer characteristics of each of the radio units that are relative fits in a predetermined range.

With this arrangement, it is possible to easily judge whether the measured transfer characteristics are correct by using the relativity of transfer characteristics of each radio unit; consequently, it is possible to avoid using incorrect correction values.

The present invention further provides a calibration method used in an adaptive array apparatus including a plurality of radio units, each made up of a transmission unit, a reception unit, and an antenna, the calibration method comprising: a selecting step of selecting a radio unit among the plurality of radio units; and a measuring step of controlling the selected radio unit and one of unselected radio units to perform transmission of signals between each other in order to measure transfer characteristics of the selected radio unit on the basis of the signals received.

With this arrangement, it is possible to measure the transfer characteristics of the radio units without having additional equipment.

The present invention further provides a program recording medium storing a computer-readable program to be executed by a computer in an adaptive array apparatus including a plurality of radio units, each made up of a transmission unit, a reception unit, and an antenna, the program instructing the computer to execute: a selecting step of selecting at least one radio unit among the plurality of radio units; and a measuring step of controlling the selected radio unit and one of unselected radio units to perform transmission of signals between each other in order to measure transfer characteristics of the selected radio unit on the basis of the signals received.

The computer in the adaptive array apparatus that reads the program is able to measure the transfer characteristics of the radio units without having additional equipment.

BRIEF DESCRIPTION OF THE DRAWINGS

FIG. 3 is a block diagram that shows the overall construction of a radio base station;

FIG. 5 simply lays out the contents of the processes undergone within each user signal processing unit;

FIG. 6 shows the interrelationships between the actual radio units 1 through 4 and the theoretical radio units Ant1 through Ant4;

BEST MODE FOR CARRYING OUT THE INVENTION

Figure 1:
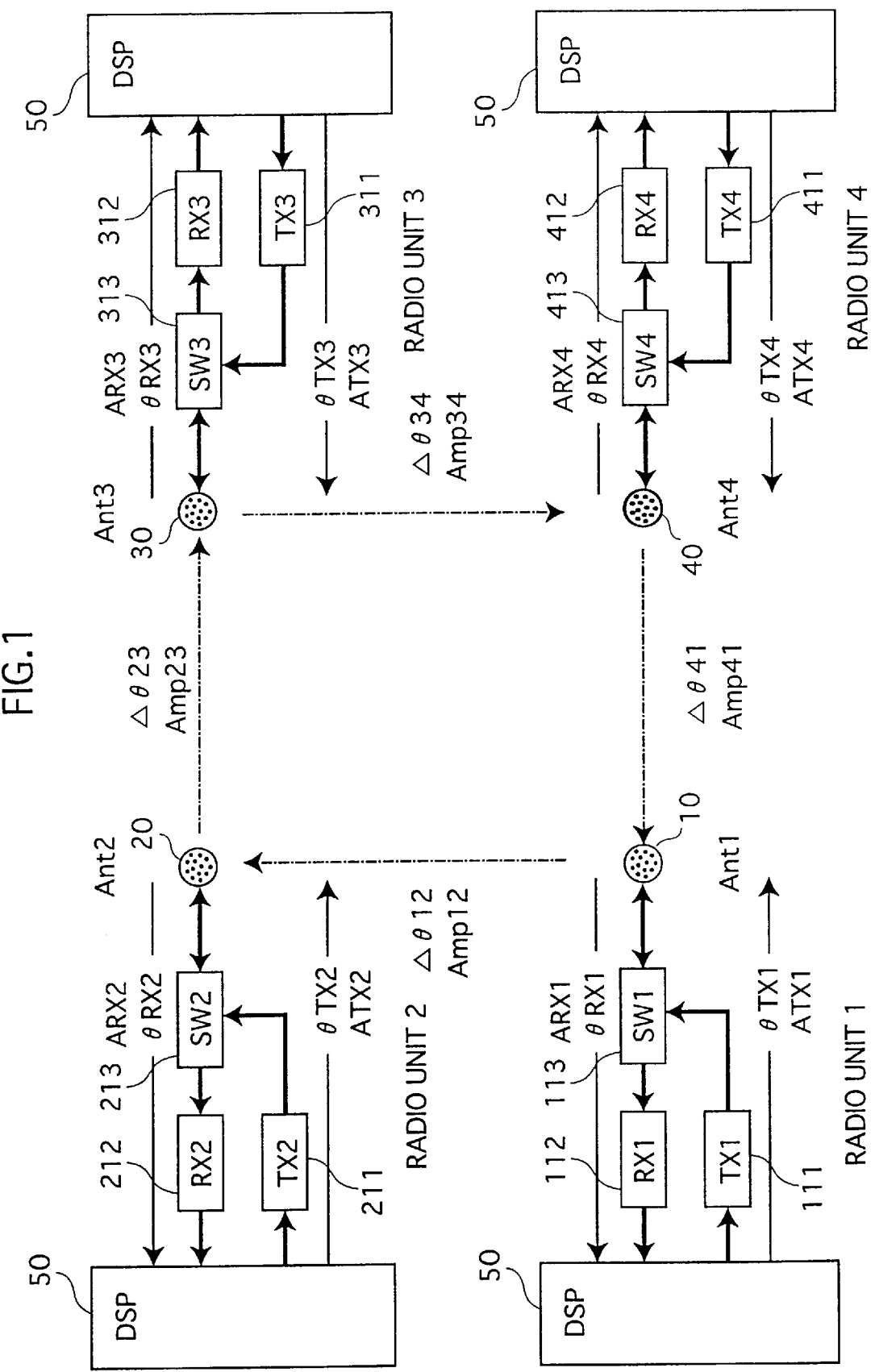
FIG. 1 shows the general structure of the primary units of an adaptive array apparatus of an embodiment of the present invention.

The preferred embodiment of the radio base station, mobile phone, and measurement apparatus of the present invention will be explained in the following order.
1. Radio Base Station
1.1. Overview
1.1.1. General Structure
1.1.2. General Operations
1.1.3. Supplementary Explanation
1.2. Structure of Radio Base Station
1.2.1. Structure of Digital Signal Processor
1.2.2. Structure of User Signal Processing Unit
1.2.3. Calibration Process
2. Mobile Phone
2.1. Structure
3. Measurement Apparatus
3.1. Structure
3.2. Calibration Process
4. Examples of Other Variations of the Invention
1. Radio Base Station
1.1. Overview The following is a general overview of an adaptive array apparatus of the preferred embodiment when it performs the function of a radio base station in a mobile communications network.
1.1.1. General Structure FIG. 1 shows the general structure of the primary units of an adaptive array apparatus of an embodiment of the present invention.

As indicated in this drawing, the adaptive array apparatus includes radio units 1 through 4 and DSP (Digital Signal Processors) 50. For the sake of clarity, 4 DSP 50 units are shown in the drawing, but, in actuality, only 1 is required. This adaptive array apparatus independently measures the correction values and, under normal communication conditions, it uses this measured correction value to perform its communication functions. In other words, this adaptive array apparatus also serves the function of a measurement apparatus.

Radio unit 1 is composed of an antenna 10, a transmission unit 111 (TX1 in the drawing), a reception unit 112 (RX1), and an antenna switch 113 (SW1). Radio units 2 through 4 are constructed in the same fashion.

$\theta$RX1 and ARX1 respectively represent the amount of phase fluctuation and the amount of amplitude fluctuation produced when a signal passes through the antenna 10, the antenna switch 113, and the reception unit 112. $\theta TX1$ and $ATX1$ respectively represent the amount of phase fluctuation and the amount of amplitude fluctuation produced when a signal passes through the transmission unit 111, the antenna switch 113, and the antenna 10. $\theta RX2$ through $\theta RX4$ and $ARX2$ through $ARX4$ similarly represent the amount of phase and amplitude fluctuation occurring in their respective radio units.

Additionally, $\Delta\theta 12$ and $Amp12$ respectively represent the phase fluctuation amount and amplitude fluctuation amount of radio unit 2 relative to radio unit 1, which is used as the standard. $\Delta\theta 23$, $\Delta\theta 34$, and $\Delta\theta 41$, as well as $Amp23$, $Amp34$, and $Amp41$ similarly represent the relative amounts of phase and amplitude fluctuation occurring in their respective radio units relative to radio unit 1. These are defined by the following formulas.

(1) $\Delta\theta 12=((\theta TX1-\theta RX1)-(\theta TX2-\theta RX2))$ (2) $\Delta\theta 23=((\theta TX2-\theta RX2)-(\theta TX3-\theta RX3))$ (3) $\Delta\theta 34=((\theta TX3-\theta RX3)-(\theta TX4-\theta RX4))$ (4) $\Delta\theta 41=((\theta TX4-\theta RX4)-(\theta TX1-\theta RX1))$ (5) $Amp12=((ATX1/ARX1)/(ATX2/ARX2))$ (6) $Amp23=((ATX2/ARX2)/(ATX3/ARX3))$ (7) $Amp34=((ATX3/ARX3)/(ATX4/ARX4))$ (8) $Amp41=((ATX4/ARX4)/(ATX1/ARX1))$ This adaptive array apparatus performs array transmissions and array-receptions of known signals within radio units 1 through 4. Then, while changing the phase amounts and amplitude amounts, it seeks an adjustment value for the purpose of creating an array antenna pattern that is the same at the time of transmission and the time of reception. Accordingly, the adaptive array apparatus finds the relative phase fluctuation amounts and relative amplitude fluctuation amounts indicated by these formulas (1) through (8), and determines correction values for the purpose of compensating for the phase and amplitude fluctuation amounts. These correction values are defined by the following formulas (9) through (17).

(9) $\theta$ correction $1=0$

(10) $\theta$ correction $2=\Delta\theta 12$

(11) $\theta$ correction $3=\Delta\theta 12+\Delta\theta 23$

(12) $\theta$ correction $4=\Delta\theta 12+\Delta\theta 23+\Delta\theta 34$

(13) $\theta$ correction $1=1$

(14) $\theta$ correction $2=Amp12$

(15) $\theta$ correction $3=Amp12*Amp23$

(16) $\theta$ correction $4=Amp12*Amp23*Amp34$ $\theta$ correction x and A correction x are the correction values for the transmission signals from radio unit x (x ranging from 1 through 4).

The above correction values are correction values relative to radio unit 1, which serves as the standard. The reason that it is acceptable to use these relative correction values is as follows: If the difference of the phase fluctuation amounts and the ratio of the amplitude fluctuation amounts of the radio units are equal at the time of reception and transmission, then, when the weight vector calculated at the time of reception is used, the same array antenna pattern as the array antenna pattern that was present at the time of reception will result.

Additionally, in the above equations (9) through (16), radio unit 1 was used as the standard, however it is acceptable to use any of the radio units as the standard. For instance, if radio unit 3 were to serve as the standard, the following equations would define the phase correction values ((9') through (12')) and the amplitude correction values ((13') through (16')).

(9') $\theta$ correction $1=\Delta\theta 34+\Delta\theta 41$ (10') $\theta$ correction $2=\Delta\theta 34+\Delta\theta 41+\Delta\theta 12$ (11') $\theta$ correction $3=0$ (12') $\theta$ correction $4=\Delta\theta 34$ (13') A correction $1=Amp34*Amp41$ (14') A correction $2=Amp34*Amp41*Amp12$ (15') A correction $3=1$ (16') A correction $4=Amp34$

1.1.2. General Operations

The following is an explanation of the general method for measuring the relative phase and amplitude fluctuation amounts.

Figure 2A:
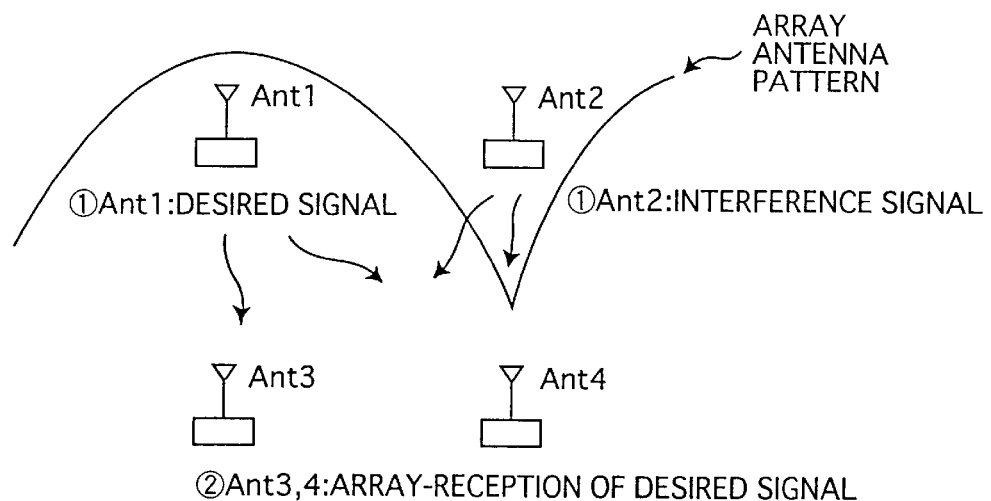
FIGS. 2A and 2B are explanatory drawings showing the general operations of an adaptive array apparatus as it measures the relative amount of phase fluctuation $\Delta\theta 34$ and the relative amount of amplitude fluctuation Amp34.
Figure 2B:
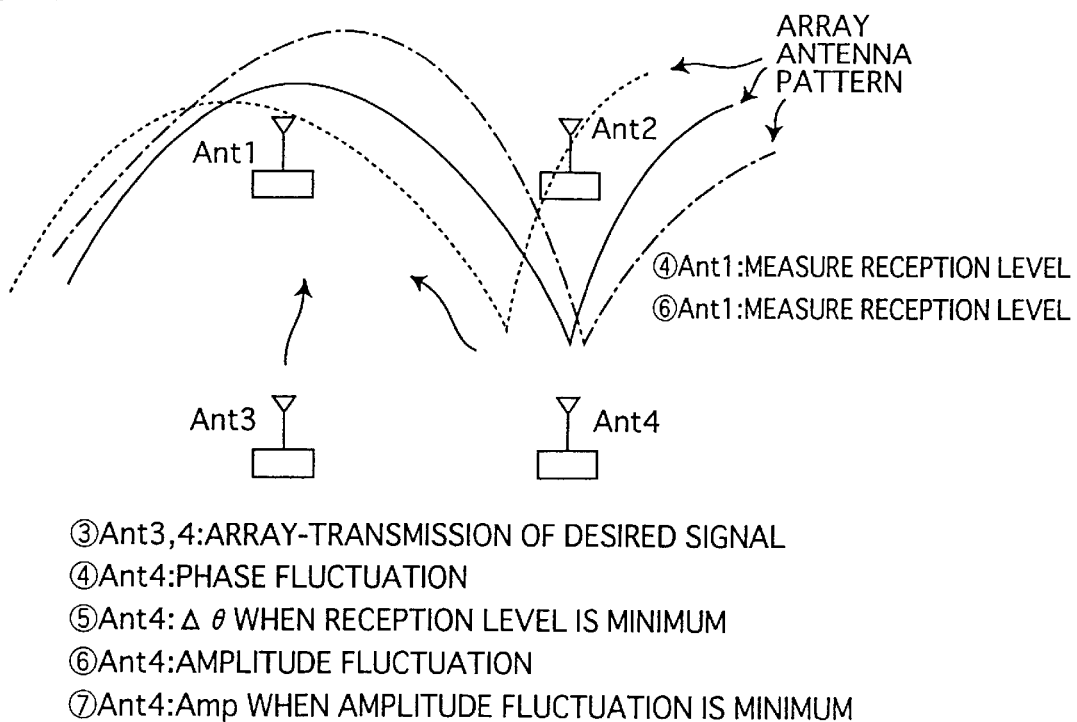

FIGS. 2A and 2B are explanatory drawings that show the general operations of an adaptive array apparatus when $\Delta\theta 34$ and $Amp34$, expressed by equations (3) and (7), are measured.

FIG. 2A shows the manner in which radio unit 1 independently transmits a desired signal and radio unit 2 independently transmits an interference signal wave, both radio units transmitting on the same frequency (in the drawing). The desired signal and the interference signal denote differing known series of data.

The same drawing also shows the manner in which radio units 3 and 4 serve as a 2-antenna adaptive array apparatus, receiving the desired signal by forming an array antenna pattern that corresponds to radio unit 1 (in the drawing). That is to say, DSP 50 calculates a weight vector for the purpose of separating out the desired signal from a received signal on which both the desired signal and the interference signal are multiplexed.

FIG. 2B shows the manner in which the radio units switch between transmission and reception. Essentially, radio units 3 and 4, serving as a 2-antenna adaptive array apparatus, perform an array reception and use the weight vector calculated at the time of that array reception to perform an array transmission of the desired signal (in the drawing).

As indicated by the solid line in the drawing, the array antenna pattern produced at the time of this array transmission will be the same as that produced at the time of array reception as long as the amount of phase fluctuation and amplitude fluctuation within the transmission units and reception units within radio units 3 and 4 are the same. In such a case, the directivity is oriented toward radio unit 2, and a null is directed toward radio unit 3. (When "a null is directed" to a point or a direction, it means that it is impossible or difficult for the radio waves to reach at such a point or a direction.)

In actuality, the amount of phase and amplitude fluctuation within the transmission units and reception units are never equal. Therefore, as indicated by the dashed line and the dashed-dotted line in the drawing, a divergence in the array antenna pattern is produced.

At this point, DSP 50 adds phase compensation amounts $\Delta\theta$ to the transmission signal from radio unit 4 while altering the compensation amounts by 360 degrees (for example, one degree at a time, from −180 to +180 degrees). While this occurs, radio unit 2 measures the signal reception level in accordance with these alterations (in the drawing). The phase compensation amount $\Delta\theta$ at the time when the reception signal level is the smallest satisfies the equation $\Delta\theta 34=((\theta TX3-\theta RX3)-(\theta TX4-\theta RX4))$. Accordingly, $\Delta\theta 34$ is set as the phase compensation amount $\Delta\theta$ at this time (in the drawing).

Furthermore, DSP 50 also gradually alters the transmission signal amplitude compensation amount Amp coef of radio unit 4 (for example, from 0.5 to 2, by varying 0.1 at a time). While this occurs, radio unit 2 measures the signal reception level in accordance with these alterations (in the drawing). The amplitude compensation amount Amp coef at the time when the reception signal level is the smallest satisfies the equation Amp34=((ATX3/ARX3)/(ATX4/ARX4)). Accordingly, Amp34 is set as the amplitude compensation amount Amp coef at this time ( ).

In this manner, the adaptive array apparatus measures a relative phase fluctuation amount $\Delta\theta 34$ and a relative amplitude fluctuation amount Amp34. And in the same fashion, it measures a) $\Delta\theta 41$ and Amp41, b) $\Delta\theta 12$ and Amp12, and c) $\Delta\theta 23$ and Amp23.

Furthermore, DSP 50 determines whether the measured relative phase and amplitude fluctuation amounts are appropriate by using formulas (17) and (18) below.

(17) $|\Delta\theta 12+\Delta\theta 23+\Delta\theta 34+\Delta\theta 41|<\theta thre$ In this case, $\theta thre$ is, for example, the threshold value of 1 degree. The left section of this equation (17) involves the addition of the right sections of equations (1) through (4) listed earlier. Ideally, these amounts should add up to 0 (degrees), but in reality, measurement errors and mismeasurements due to waves of an external source are produced. Therefore, it is desirable that judgments be made based on the relationship to $\theta thre$.

(18) A thre min<Amp12*Amp23*Amp34*Amp41<A thre max

In this case, for example, A thre min might be a threshold minimum value of 0.95 and A thre max a threshold maximum of 1.05. The middle section of this equation (18) involves the multiplication of the right sections of equations (5) through (8) listed earlier. Ideally, these amounts should add up to 1, but for the same reasons mentioned above, it is desirable that judgments be made based on the relationship to A thre min and A thre max.

When the values satisfy the conditions of equations (17) and (18), the adaptive array apparatus uses them to calculate the correction values indicated in equations (9) through (16) (or equations (9') through (16')). Then, at the time of transmission, DSP 50 uses these values to correct the transmission signal.

1.1.3. Supplemental Explanation

The following is a supplemental explanation regarding the relative phase fluctuation values and the relative amplitude fluctuation values.

As indicated in FIGS. 2A and 2B, the adaptive array apparatus performs an array reception into radio unit 3 and radio unit 4. And when it performs an array transmission by using the weight vector calculated at the time of the array reception, the phase fluctuation amount produced by radio unit 3 at the time of transmission relative to the time of reception is $(\Delta TX3-\Delta RX3)$ and the phase fluctuation amount produced by radio unit 4 at the time of transmission relative to the time of reception is $(\Delta TX4-\Delta RX4)$.

In like fashion, the amplitude fluctuation amount produced by radio unit 3 at the time of transmission relative to the time of reception is (ATX3/ARX3) and the amplitude fluctuation amount produced by radio unit 4 at the time of transmission relative to the time of reception is (ATX4/ARX4)

Fluctuation of the phase$\Delta\theta$ of the transmission signal of radio unit 4 is done in small increments, and when the reception level at radio unit 2 is at a minimum, this means that the phase fluctuation amounts at radio units 3 and 4 have been compensated for.

That is, $(\Delta TX3-\Delta RX3)=(\Delta TX4-\Delta RX4)+\Delta\theta 34$. Accordingly, $\Delta\theta 34=((\Delta TX3--\Delta\theta RX3)-(\Delta TX4-\Delta RX4))$.

In like fashion, when the reception level at radio unit 2 is at a minimum, this means that the amplitude fluctuation amounts at radio units 3 and 4 have been compensated for.

That is, (ATX3/ARX3)=(ATX4/ARX4)*Amp34. Accordingly, Amp34=((ATX3/ARX3)/(ATX4/ARX4)).

1.2. Structure of Radio Base Station

FIG. 3 is a block diagram that shows the overall structure of a radio base station. As indicated in the diagram, it includes: a base band unit 70; a modem unit 60; a digital signal processor 50; front end units 11, 21, 31, and 41; antenna 10, 20, 30, and 40; and control unit 80. This radio base station is an adaptive array apparatus that creates wireless connections with mobile stations by using a plurality of antennas and forming array antenna patterns by weighting the transmission and reception signals of each antenna. It is constructed for the purpose of connecting PHS phones by using TDMA/TDD (Time Division Multiple Access/Time Division Duplex) methods set to meet PHS standard.

Base band unit 70 functions between a plurality of circuit lines that are connected via a telephone switching network and the modem unit 60. For each of a plurality of signals (base band signals that carry audio or data information) that require spatial multiplexing, the base band unit 70 performs a TDMA/TDD process for multiplexing and dividing the signals so that they fit into TDMA/TDD frames. A TDMA/TDD frame is made up of a 5 mS period divided into 8 equal time slots, 4 transmission time slots and 4 reception time slots.

Concretely speaking, for the purpose of time division multiplexing, the base band unit 70 multiplexes quadruply the signals from the circuit lines to the modem unit 60 for each TDMA/TDD frame. And further, for the purpose of spatial multiplexing, up to 4 signals can be sent to the modem unit 60 for every 1 transmission time slot. Additionally, the base band unit 70 inputs from the modem unit 60 to the circuit lines up to 4 signals for every 1 reception time slot, resulting in time division multiplexing that allows for an output to a plurality of circuit lines.

The modem unit 60 modulates the signals inputted from the base band unit 70, and it demodulates the signals inputted from DSP 50. The method used for this modulation and demodulation is $\pi/4$ shift QPSK (Quadrature Phase Shift Keying)

DSP 50 is a digital signal processor that runs programs for performing weight vector calculations and the like. In particular, during the calibration process, this unit calculates the correction value to be used to compensate for the change in transfer characteristics between the time of reception and the time of transmission at radio units 1 through 4.

At the time of array transmission, front end units 11, 21, 31, and 41 convert into RF signals the signals that were weighted by DSP 50 and transmit the converted signals from antennas 10 through 40. At the time of array reception, the front end units convert the signals from antennas 10 through 40 into base band signals and output the converted signals to DSP 50. Henceforth, the assembly of antenna 10 and front end unit 11 shall be referred to as radio unit 1. In the same manner, the remaining antenna and front end unit shall be referred to as radio units 2, 3, and 4.

As shown in FIGS. 2A and 2B, radio units 1 through 4 independently transmit and receive each desired signal or interference signal generated by DSP 50 during its calibration process. Further, 2 of these radio units work in conjunction to perform array transmissions and array receptions of the desired signal or interference signal.

Control unit 80 serves to control the overall radio base station, including to switch between transmission and reception of each radio unit.

1.2.1. Structure of Digital Signal Processor

Figure 4:
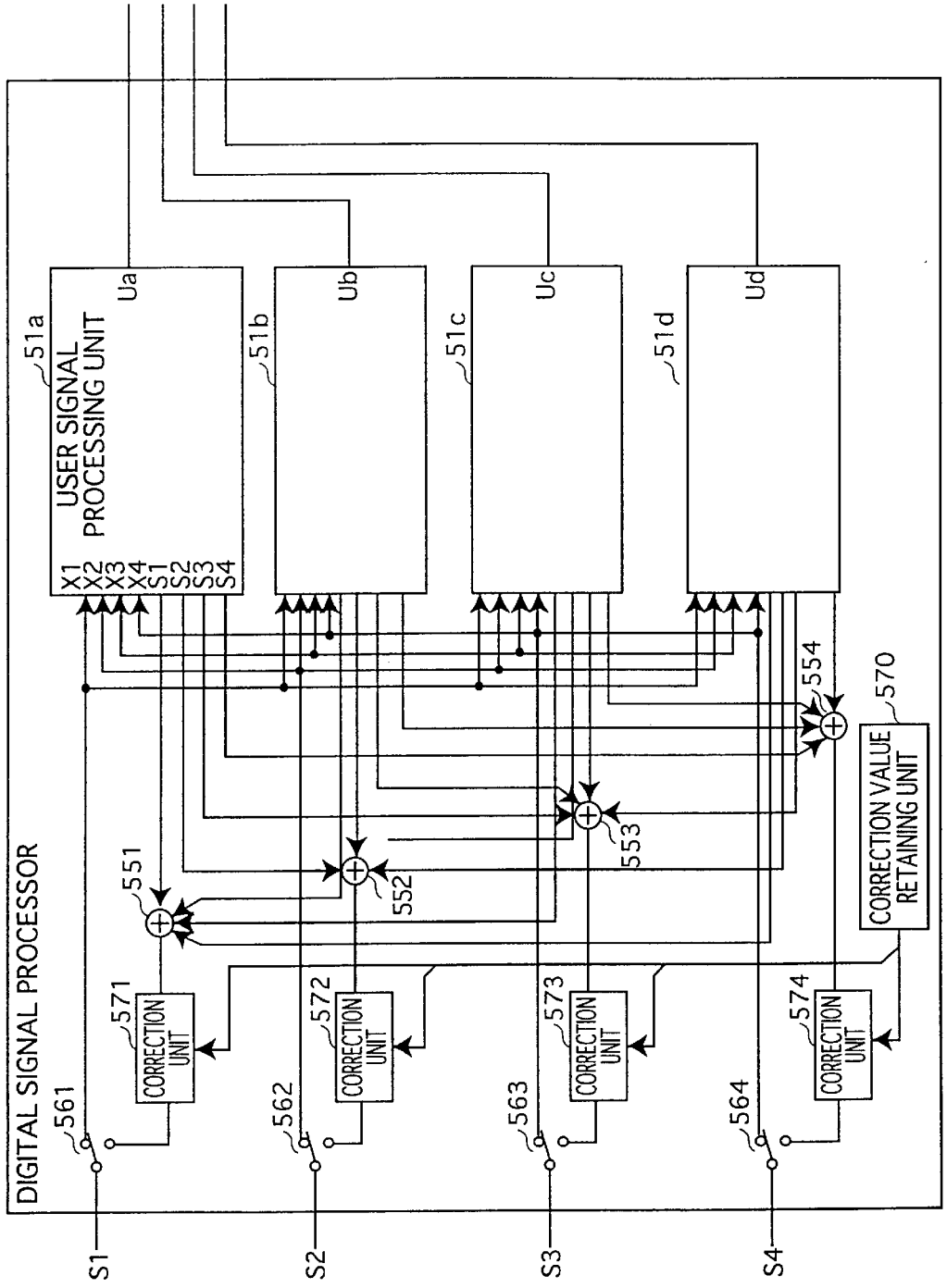
FIG. 4 is a block diagram that shows the detailed construction of Digital Signal Processor 50.

FIG. 4 is a block diagram that shows the detailed structure of DSP 50. It shows the functions that take place as a result of DSP 50 running its programs.

As indicated in the drawing, DSP 50 is provided with user signal processing units 51a through 51d, adders 551 through 554, switches 561 through 564 for switching between transmission and reception, correction value retaining unit 570, and correction units 571 through 574.

User signal processing units 51a through 51d are provided to correspond to the maximum of 4 user signals that are spatially multiplexed in each time slot. Normally (at times other than times of calibration processing), each user signal processing unit serves to control the array reception and array transmission that involves the usage of all 4 radio units. That is, at times of reception, the user signal processing units calculate weight vectors from the various reception signals coming from radio units 1 through 4. And, using these weight vectors, they extract a user signal by combining the reception signals that are input by the radio units 1 through 4 via the switches 561 through 564. At times of transmission, the user signal processing units use the weight coefficient calculated during the immediately preceding reception time slot to generate a weighted user signal and output that signal to each of the radio units 1 through 4.

At times of calibration processing, there are cases in which each user signal processing unit: a) controls array reception and array transmission so that it occurs through 2 antennas; b) controls the desired signal so that, rather than being transmitted and received as an array, it is an independently transmitted and received signal via 1 radio unit; and c) controls the interference signal so that, rather than being transmitted and received as an array, it is an independently transmitted and received signal via 1 radio unit. By performing the consecutive processing indicated in FIGS. 2A and 2B so as to cover the above-mentioned cases, DSP 50 determines the relative phase fluctuation amounts ($\Delta\theta 34$, $\Delta\theta 41$, $\Delta\theta 12$, and $\Delta\theta 23$) and relative amplitude fluctuation amounts (Amp34, Amp41, Amp12, and Amp23), and uses these amounts to calculate the correction values ($\theta$ correction 1 through $\theta$ correction 4, and A correction 1 through A correction 4).

The adder 551 combines the weighted components of each user transmission signal corresponding to radio unit 1. However, in cases such as that indicated in FIG. 2A where independent transmission takes place from radio unit 1 or that indicated in FIG. 2B where a 2-antenna array transmission is performed using radio unit 1, the transmission signals (desired signals, interference signals, etc.) from any of the user signal processing units are directly outputted without being added to any other signals. Adders 552 through 554 perform the same function, varying in the fact that they do so in relation to their respective radio units 2 through 4.

Correction value retaining unit 570 retains the correction values ($\theta$ correction 1 through $\theta$ correction 4, and A correction 1 through A correction 4) that are calculated during the calibration process.

At times other than that of the calibration process, correction unit 571, using the correction values $\theta$ correction 1 and A correction 1 retained in the correction value retaining unit 570, corrects the transmission signals arising from adder 551 and outputs these signals to radio unit 1 via switch 561. And at times of calibration processing, the transmission signals arising from adder 551 are output directly to radio unit 1 via switch 561. However, if the relative phase and amplitude fluctuation amounts at radio unit 1 are being measured during a time of calibration processing, the phase compensation amount $\Delta\theta$ and the amplitude compensation amount Amp are applied to the transmission signals while being altered gradually.

Correction units 572 through 574 function in the same manner in relation to their respective radio units other than the fact the correction values retained by the correction value retaining unit 570 are different.

1.2.2. Structure of User Signal Processing Unit

Figure 7:
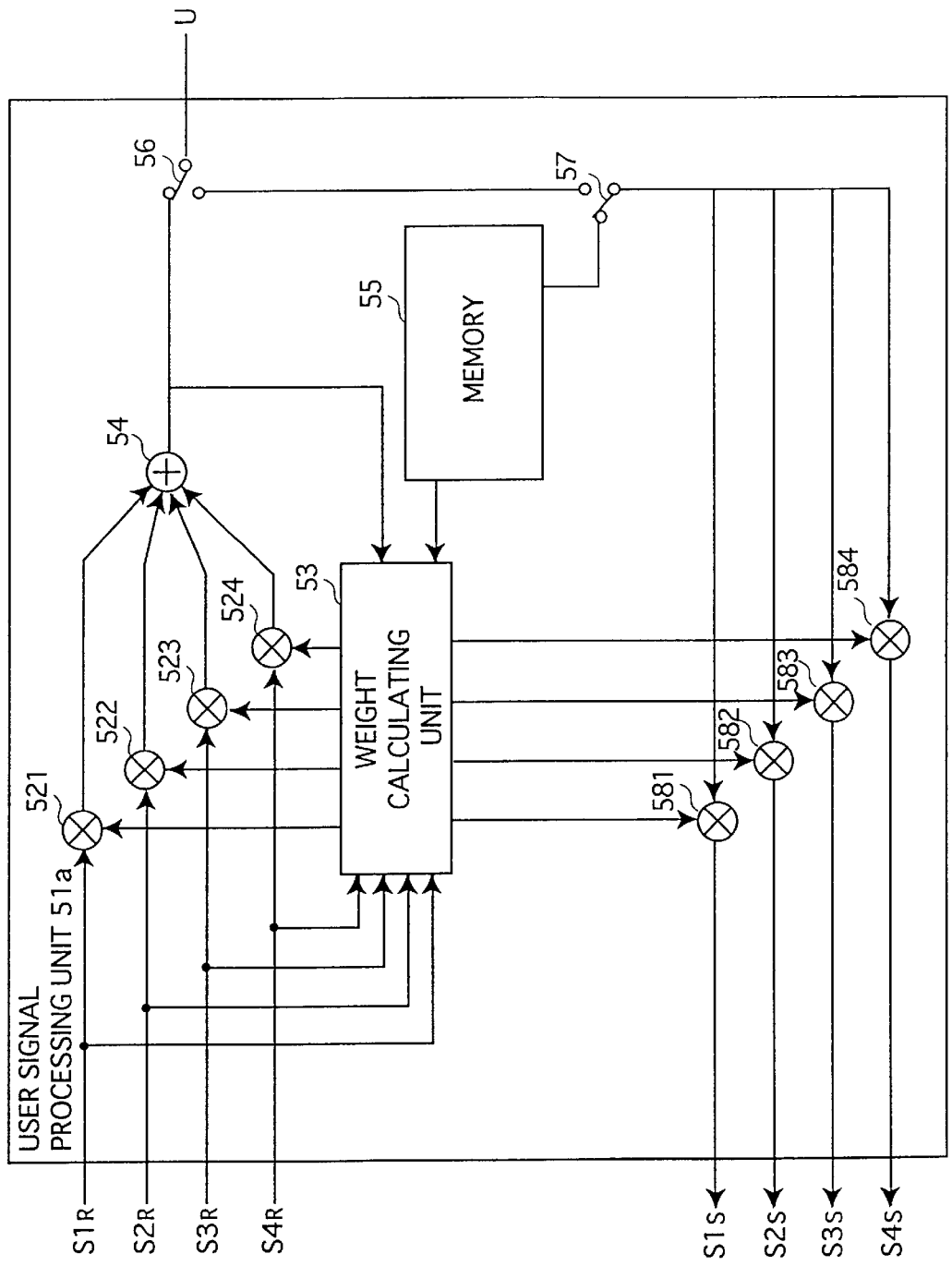
FIG. 7 is a block diagram showing the detailed construction of user signal processing unit 51*a;*

FIG. 7 is a block diagram showing the detailed structure of the user signal processing unit 51a. User signal processing units 51b through 51d have the same structure, so here user signal processing unit 51a will serve as a representative example as it is explained.

As indicated in the drawing, the user signal processing unit 51a is provided with a weight calculating unit 53, an adder 54, a memory 55, switches 56 and 57, multipliers 521 through 524, and multipliers 581 through 584.

When calibration processing is not taking place, the weight calculating unit 53 calculates a weight vector in order to minimize an error between a reference signal generated by the memory 55 and the sum of the weighted reception signals S1R through S4R from each of the radio units 1 through 4, during each symbol period of a fixed bit pattern period within a reception time slot. And at times of calibration, the weight vector calculation for the purpose of an array reception using 2 antennas is performed in the same manner. The following is an explanation of weight vector calculation for a 4-antenna array reception. Note that the process is the same for 2-antenna array receptions; simply the number of elements involved is reduced.

Concretely speaking, the weight calculating unit 53 uses the following formula (19) for minimizing the error e(t) by adjusting the W1 (t−1) through W4 (t−1) values and taking these adjusted values to serve as weight coefficients for the symbol at time t, W1(t) through W4(t).

(19) $e(t)=d(t)-(W1(t-1)*X1'(t)+W2(t-1)*X2'(t)+W3(t-1)*X3'(t)+W4(t-1)*X4'(t))$

In the above formula: t represents the timing of a symbol unit; d(t) represents the symbol data within the known reference signal (or training signal); W1 (t−1) through W4 (t−1) represent either the weight coefficient of each antenna that was calculated for the immediately preceding symbol or the weight coefficient calculated at the immediately preceding reception time slot; and X1(t) through X4(t) represent the reception signals for antennas 10 through 40.

The weight vectors are adjusted in the above manner for every symbol. Therefore, even if the error e(t) is large at the beginning of a reference signal period within the reception time slot, it will be reduced to a minimum (or reduced to 0) by the end of that reference signal period.

Furthermore, at the time of the symbol period in which the weight coefficient within the reception time slot is calculated and at times of symbol periods to follow, the weight calculating unit 53 outputs the calculated weight coefficients to the multipliers 521 through 524. Additionally, during a given transmission time slot, the weight calculating unit 53 outputs to the multipliers 581 through 584 the weight coefficient calculated during the reception time slot that corresponds to the immediately preceding transmission time slot.

The memory 55 stores a) waveform data of series of symbols that represent the reference signals used at times other than calibration processing (times of normal communication with mobile stations), b) waveform data of series of symbols that represent the desired signals used for calibration processing, and c) waveform data of series of symbols that represent interference signals. The reference signal is retrieved by the weight calculating unit 53 in synchronization with the symbol timing during the reception period of known fixed bit patterns (fixed symbols) within a reception time slot. For example, in the case of PHS systems, the SS (start symbol), PR (preamble), and UW (unique word) are fixed symbols that appear in the front end of the reception time slot.

It is acceptable if the desired signal and the interference signal are known series of symbol data such as PN (Pseudorandom Noise) symbols, and it is desirable that they be arranged orthogonal to each other. If arranged orthogonal to each other, the weight vectors can be more rapidly converged and more accurately calculated. Note that when the same PN symbols or fixed symbols are used, it is best to stagger the timing (for instance, by 0.5 symbol periods).

In cases such as that illustrated by Ant3 and Ant4 of FIG. 2A wherein the user signal processing unit is controlling a 2-antenna array reception, the desired signal and the interference signal are retrieved by the weight calculating unit 53 as reference signals (training signals). And in cases such as that illustrated by Ant1 and Ant2 of FIG. 2A wherein the user signal processing unit is controlling an independent transmission, the desired signal and the interference signal are retrieved from the memory 55 as transmission signals, and supplied to multipliers 581 through 584 via switch 57. However, only one output will be transmitted from a specific multiplier among the multipliers 583 through 584 which corresponds to a radio unit that produces an independent transmission.

Although it is acceptable that each user signal processing unit have the same structure, for ease of explanation, each processing unit will be assumed to undergo a particular fixed process during the calibration process.

FIG. 5 simply lays out the contents of the processes undergone within each user signal processing unit. Ant1 through Ant4 within the drawing represent theoretical radio units that are placed in direct 1-to-1 relationships with the physically existing radio units 1 through 4. These 1-to-1 relationships are shown in FIG. 6. There are numerous possible relationships, and the present embodiment has at least the 4 indicated by Cases 1 through 4 of FIG. 6.

As indicated in the drawings, during the first half of the calibration process (that is, in cases such as that illustrated in FIG. 2A, control unit 80 causes all radio units to use the same frequency, with Ant1 and Ant2 performing transmission, and Ant3 and Ant4 performing reception.

In this case, as indicated by the "First Half" column in FIG. 5, user signal processing unit 51a has Ant1 transmit an independent desired signal. That is, it generates a desired signal and supplies it to Ant1. User signal processing unit 51b has Ant2 transmit an independent interference signal. That is, it generates an interference signal and supplies it to Ant2. User signal processing unit 51c controls a 2-antenna array reception of reception signals from both Ant3 and Ant4. That is, it calculates weight vectors.

During the second half of the calibration process (that is, in cases such as that illustrated in FIG. 2B, control unit 80 causes all radio units to use the same frequency, with Ant1 and Ant2 performing reception, and Ant3 and Ant4 performing transmission.

In this case, as indicated by the "Second Half" column in FIG. 5, user signal processing unit 51c controls a 2-antenna array transmission of a desired signal using Ant3 and Ant4. That is, it uses the weight vector calculated above to weight a desired signal and supply that signal to Ant3 and Ant4. At this time, user signal processing unit 51c alters the phase compensation amount $\Delta\theta$, as shown in of FIG. 2B, and, after that, it alters the amplitude compensation amount Amp coef, as shown in of FIG. 2B. User signal processing unit 51a receives an independent reception signal from Ant1. User signal processing unit 51b receives an independent reception signal and an indication of the level of that reception signal from Ant2 each time the phase compensation amount $\Delta\theta$ and the amplitude compensation amount Amp coef are altered.

1.2.3. Calibration Process

Figure 8:
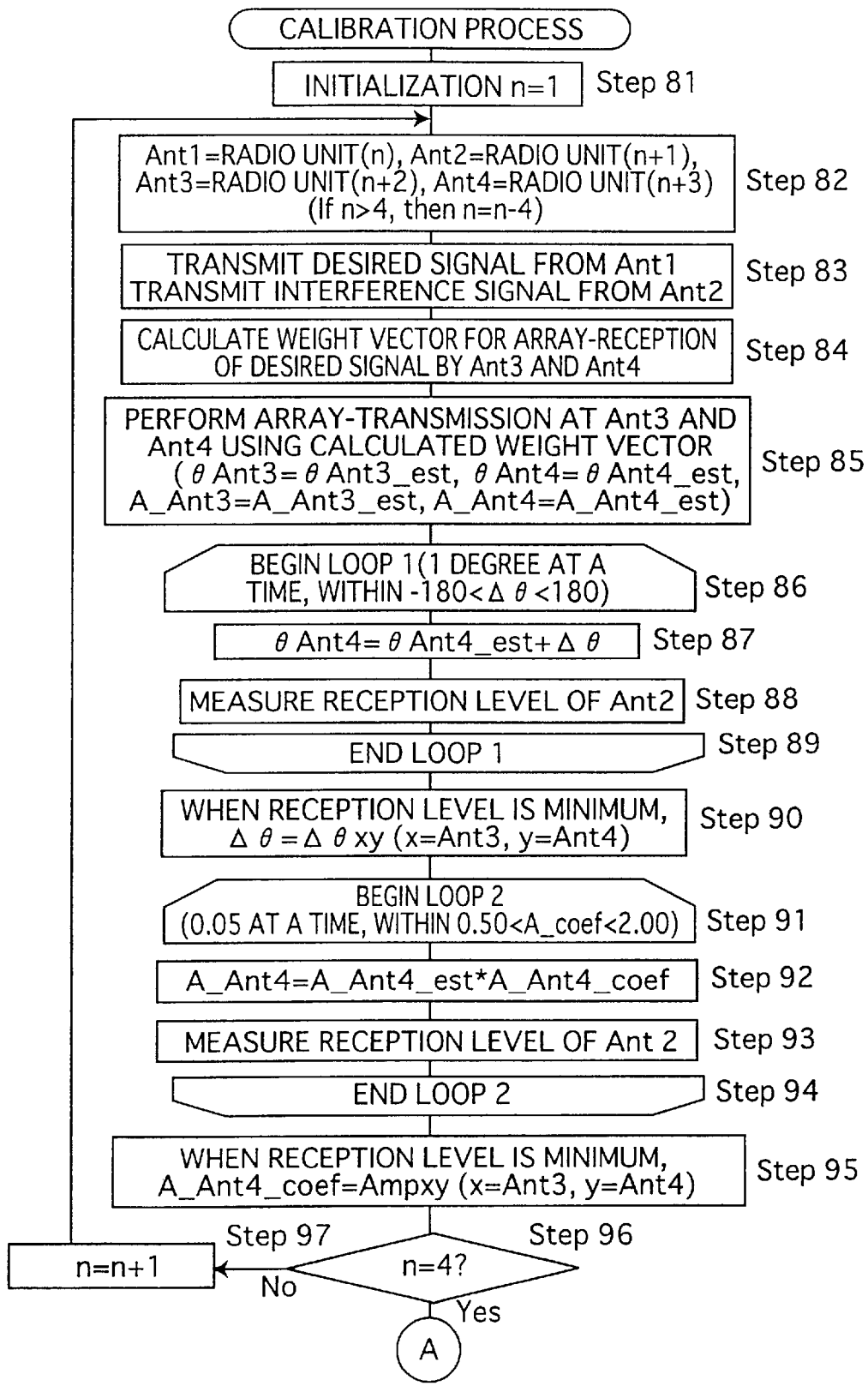
FIG. 8 is a flow chart showing the contents of the calibration process.
Figure 9:
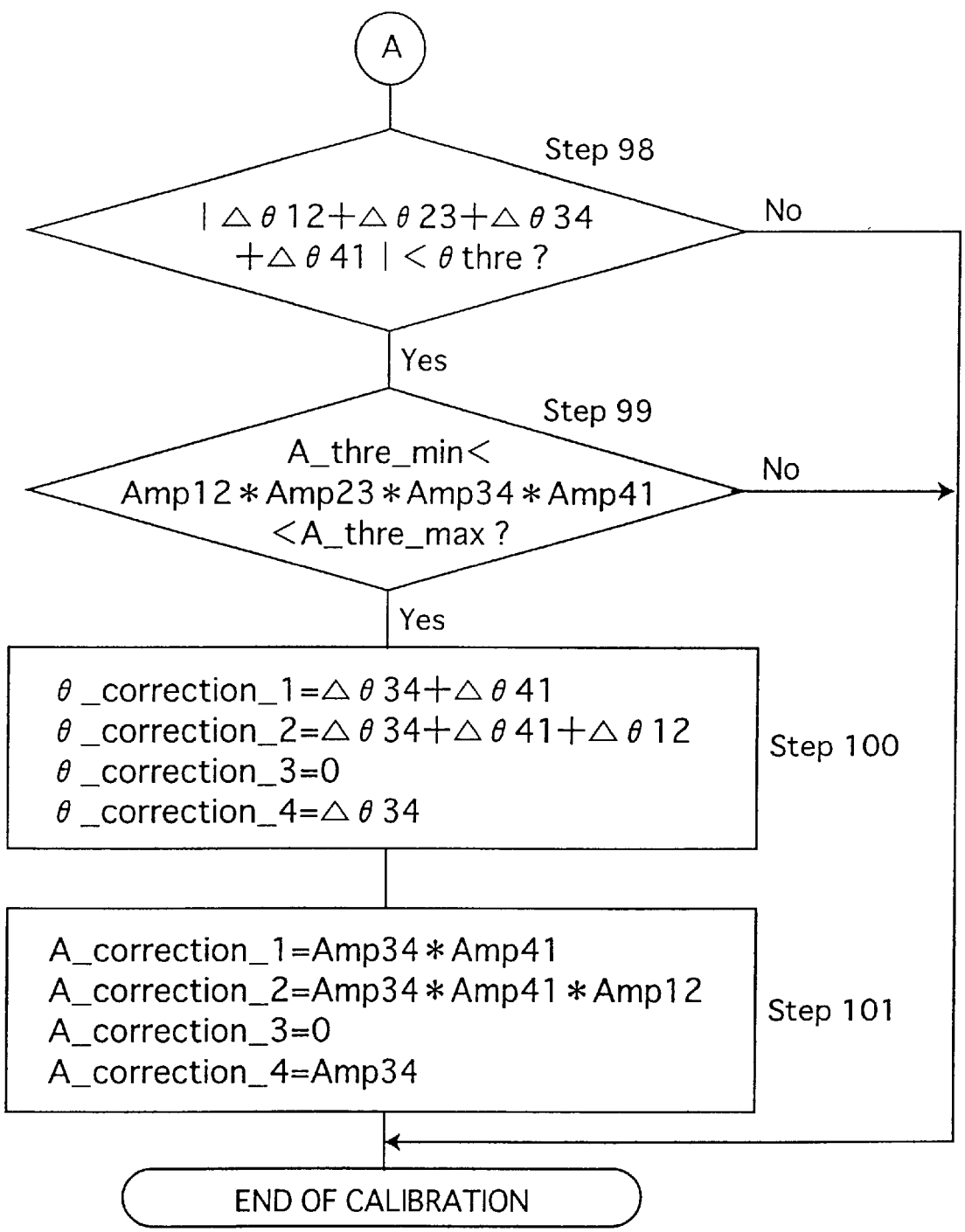
FIG. 9 is a flow chart showing the continuation of the calibration process.

FIGS. 8 and 9 are flowcharts showing more detailed contents of the calibration process. Within the drawings, n represents a variable for the purpose of counting from 1 to 4.

After variable n is initialized (n=1, Step 81), DSP 50 selects which physically existing radio units 1 through 4 will serve as which theoretical radio units Ant1 through Ant4 (Step 82). In this case, Ant1 is selected to independently transmit and receive the desired signal, Ant2 to independently transmit and receive the interference signal, and Ant3 and Ant4 are selected for the purpose of array reception and array transmission.

DSP 50 then has Ant 1 transmit the desired signal and has Ant 2 transmit the interference signal (Step. 83). Simultaneously, it has Ant3 and Ant4 function as an adaptive array apparatus to form an array antenna pattern for the desired signals sent from Ant1. That is to say, DSP 50 calculates a weight vector for the purpose of separating out the desired signal from the reception waves that include both desired signals and interference signals in a multiplexed form (Step 84). At this time, user signal processing unit 51a supplies the desired signal to Ant1 and user signal processing unit 51b supplies the interference signal to Ant2. Additionally, user signal processing unit 51c calculates the weight vectors of the reception signals from Ant3 and Ant4.

At this juncture, if the weight vectors are not sufficiently converged—that is, if the error e(t) of formula (19) is greater than a certain threshold value—it is acceptable to terminate the calibration process and recommence it from the beginning.

If the weight vectors are sufficiently converged, DSP 50 then a) uses Ant3 and Ant4 as a 2-antenna adaptive array apparatus to perform an array transmission of the desired signal by using the calculated weight vector, and b) switches Ant2 to independent reception (Step 85). At this time, user signal processing unit 51c weight the signal using the weight vectors. The phases and amplitudes of the transmission signals sent to Ant3 and Ant4 after being weighted are expressed by the following: $\theta Ant3 = \theta Ant3$ est, $\theta Ant4 = \theta Ant4$ est, A Ant3=A Ant3 est, and A Ant4=A Ant4 est.

At the time of this array transmission, DSP 50 maintains fixed values for phase θAnt3 and amplitudes A Ant3 and A Ant4, and adds the phase compensation amount Δθ to the phase amount of the transmission signal being sent to Ant4 while altering the amount Δθ by 1 degree at a time from −180 degrees to +180 degrees (θAnt4=θAnt4 est+Δθ). Then, for every Δθ, DSP 50 measures the reception signal level at Ant2. (Steps 86 through 89.) The phase compensation amount Δθ at this time is added to the transmission signal that is inputted by correction unit 574, shown in FIG. 4, from user signal processing unit 51c via adder 554. Then the phase compensation amount is outputted to Ant4 via switch 564.

Next, DSP 50 takes the phase compensation amount Δθ, when the reception signal level measured at Ant2 is at a minimum, to be equal to Δθ34, wherein Δθ34=(θTX3−θRX3)−(θTX4−θRX4) (Step 90).

Furthermore, DSP 50 maintains fixed values for phase θAnt3, θAnt4 (=θAnt4 est+Δθ34) and amplitude A_Ant3, and multiplies the amplitude compensation amount Amp coef with the amplitude of the transmission signal of Ant4 while gradually altering that amount by, for example, 0.05 units at a time within a range of 0.5 to 2 (A Ant4=A Ant4 est* Amp coef). Then, for every Amp coef, DSP 50 measures the reception signal level at Ant2. (Steps 91 through 94.) The amplitude compensation amount Amp coef at this time is multiplied by the transmission signal that is inputted by correction unit 574, shown in FIG. 4, from user signal processing unit 51c via adder 554. Then the amplitude compensation amount is outputted to Ant4 via switch 564.

Next, DSP 50 takes the phase compensation amount Amp coef, when the reception signal level measured at Ant2 is at a minimum, to be equal to Amp 34 wherein, Amp 34=((ATX3/ARX3)/(ATX4/ARX4)) (Step 95).

By the above stated steps, the phase and amplitude fluctuation amounts of Ant4, θ34 and Amp34, relative to Ant3 are measured.

Furthermore, by using the loop formed by Steps 96 and 97, DSP 50 alters the assembly of theoretical radio units Ant1 through Ant4, which were chosen from the physically existing radio units 1 through 4. While performing these alterations, DSP 50 measures Δθ41 and Amp41 during the second loop, Δθ12 and Amp12 during the third loop, and Δθ23 and Amp23 during the fourth loop.

Next, as shown in FIG. 9, DSP 50 judges the measured relative phase fluctuation amounts (Δθ34, Δθ41, Δθ12, Δθ23) and amplitude fluctuation amounts (Amp34, Amp41, Amp12, and Amp23) to determine whether they are valid (Steps 98 and 99). This determination is based on whether or not both of the earlier-explained equations (17) and (18) are satisfied. If either of these is not satisfied, then the calibration process is terminated and recommenced from the beginning.

When both equations (17) and (18) are satisfied, DSP 50 calculates phase correction values θ correction 1 through θ correction 4 and amplitude correction values A correction 1 through A correction 4 in accordance with the earlier-explained equations (9') through (16') (Steps 100 and 101). Then the calculated correction values are written to correction value retaining unit 570 and are used for correcting the transmission signal of the various radio units at times of normal array transmission when calibration is not taking place.

As explained above, the adaptive array apparatus of the present embodiment allows for array transmission to take place between 2 radio units selected from a plurality of radio units and other radio units. And in accordance with the resulting reception signals, the transfer characteristics of the selected radio units can be measured, making it possible to calculate the relative transfer characteristics of each radio unit without any additional apparatuses.

2. Mobile Phone

The adaptive array apparatus shown in FIG. 1 is a radio base station. By using the 4 antennas of this station as those for the purpose of transmission and those for the purpose of reception, it was possible to measure relative correction values (in other words, to calibrate the values) within the apparatus itself using one radio unit as a standard relative. However, in the case of an adaptive array apparatus that uses 2 antennas for the formation of array antenna patterns, such as a mobile phone, it is impossible to measure correction values within the apparatus itself. Such an apparatus as a mobile phone requires that the correction values be measured with the cooperation of another measurement apparatus.

Also, in case of the mobile phone, it will be arranged so that the calculated correction values will be stored, and only the transmission signals from antennas other than the one serving as the standard will be corrected with the correction values.

Below is an explanation of the structure of the present invention when its adaptive array apparatus is a mobile phone in a mobile communications network. That will be followed by an explanation of the above-mentioned measurement apparatus.

2.1. Structure

Figure 10:
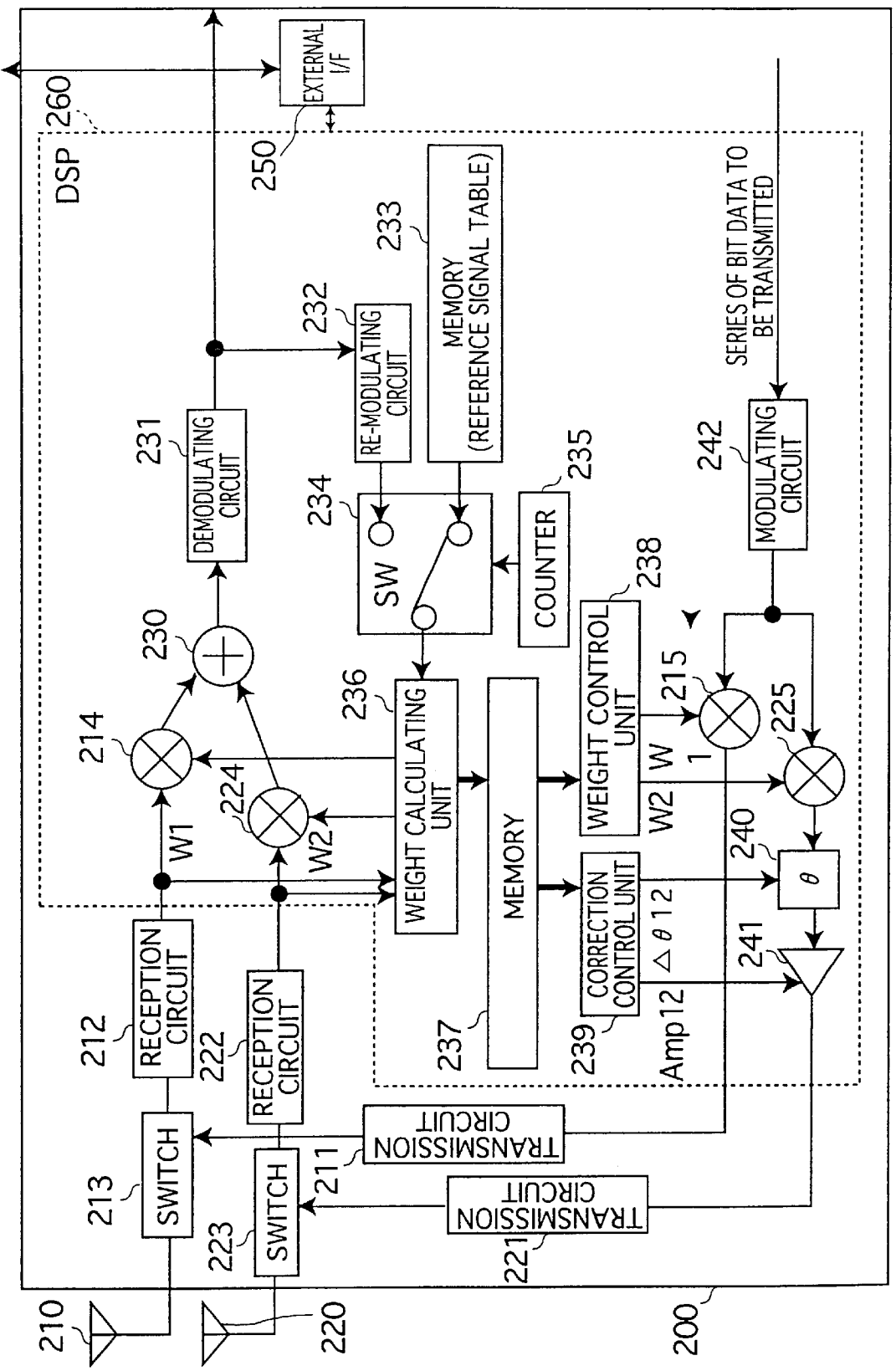
FIG. 10 is a block diagram showing the arrangement of primary units in a mobile phone of the embodiment of the present invention.

FIG. 10 is a block diagram showing the arrangement of primary units in a mobile phone of the embodiment of the present invention. As indicated in the drawing, mobile phone 200 is provided with: a) a radio unit (hereinafter referred to as radio unit A) made up of antenna 210, switch 213, transmission circuit 211, and reception circuit 212; b) a radio unit (hereinafter referred to as radio unit B) made up of antenna 220, switch 223, transmission circuit 221, and reception circuit 222; c) DSP 260 (indicated by the dashed line in the drawing); and d) external I/F 250. This is an adaptive array apparatus that transmits by forming array antenna patterns with 2 antennas.

Either of the two antennas 210 and 220 can be any of an assortment of antennas such as a rod antenna, a flat-surfaced pattern antenna, a helical antenna at the end of a rod, and a chip antenna (made up of chip components installed upon a base board). However, in this particular case, it is assumed that antenna 210 is a rod antenna and antenna 220 is a chip antenna.

DSP 260, which is indicated by the dashed lines in the drawing, actually operates in accordance with a program. In this drawing, the operations are indicated by being divided into blocks that represent particular functions. The functions of DSP 260 correspond to multipliers 214, 224, 215, and 225, adder 230, demodulating circuit 231, re-modulating circuit 232, memory 233, switch 234, counter 235, weight calculating unit 236, memory 237, weight control unit 238, correction control unit 239, phase shifter 240, amplifier 241, and modulating circuit 242.

Multipliers 214 and 224 respectively weight the reception signals inputted from reception circuits 212 and 222 by multiplying them by weight vectors W1 and W2 produced by weight calculating unit 236.

Multipliers 215 and 225 respectively weight the transmission signals inputted by modulating circuit 242 by multiplying them by weight vectors W1 and W2 produced by weight control unit 238. Then they output these weighted transmission signals to transmission circuit 211 and phase shifter 240.

Adder 230 adds together the reception signals that were weighted by multipliers 214 and 224.

Demodulating circuit 231 demodulates the reception signals that result after addition is performed by adder 230. The demodulated reception signals are outputted as reception series of bit data.

Re-modulating circuit 232 re-modulates reception series of bit data that are inputted by demodulating circuit 231, converting the reception series of bit data into symbol data (waveform data of symbols).

Memory 233 retains the reference signal table. The reference signal table stores symbol data (waveform data of symbols) that represents reference signals used at times other than the calibration process (times of normal reception from the radio base station), and it stores symbol data that represents desired signals that are used at times of calibration. In this case, the reference signals and desired signals are the same as those included in the explanation of the radio base station.

During normal reception, counter 235 counts, in synchronization with the symbol timing, the number of symbols in a reception time slot from the front end to the tail end (in a PHS, this ranges from 0 to 120). The resulting count value is used for the purpose of distinguishing symbol periods with a fixed bit pattern from other periods. During normal reception, the symbol periods of the third symbol through the $16^{th}$ symbol correspond to the fixed bit pattern periods of SS, PR, and UW.

During normal reception, when the count value from counter 235 indicates a symbol period with a fixed bit pattern, switch 234 selects the symbol data (waveform data) that represents the reference signal retrieved from memory 233. For all other periods, switch 234 selects the symbol data from re-modulating circuit 232. And during the calibration process, it selects the symbol data that represents the desired signal retrieved from the memory 233.

During times of normal reception or times of calibration, weight calculating unit 236 calculates a weight vector for every symbol in order to minimize the error between the sum of the weighted reception signals inputted from reception circuit 212 and reception circuit 222 and the symbol data inputted from switch 234. Regarding the calculation of weight vectors, in this case it is performed in the same manner as weight calculating unit 53.

Memory 237, which includes RAM and ROM, stores the weight vector calculated by weight calculating unit 236 and relative correction value for radio unit B that uses radio unit A as the standard. During normal reception, it is acceptable that this weight vector be the weight vector calculated according to the symbol at the tail end of a reception time slot. It is used in the transmission time slot that immediately follows the reception time slot. During the calibration process, memory 237 stores the weight vector calculated upon the reception of the desired signal, and this weight vector is used for the immediately following desired signal transmission. The weight vectors for radio units A and B are referred to respectively as W1 and W2.

Additionally, the correction values are expressed using the following formulas (20) and (21), and the values measured during the calibration process are written onto the ROM storage area within memory 237 before it is shipped from the manufacturers.

(20) $\Delta\theta 12=((\theta TX1-\theta RX1)-(\theta TX2-\theta RX2))$

(21) $Amp12=((ATX1/ARX1)/(ATX2/ARX2))$

Figure 11:
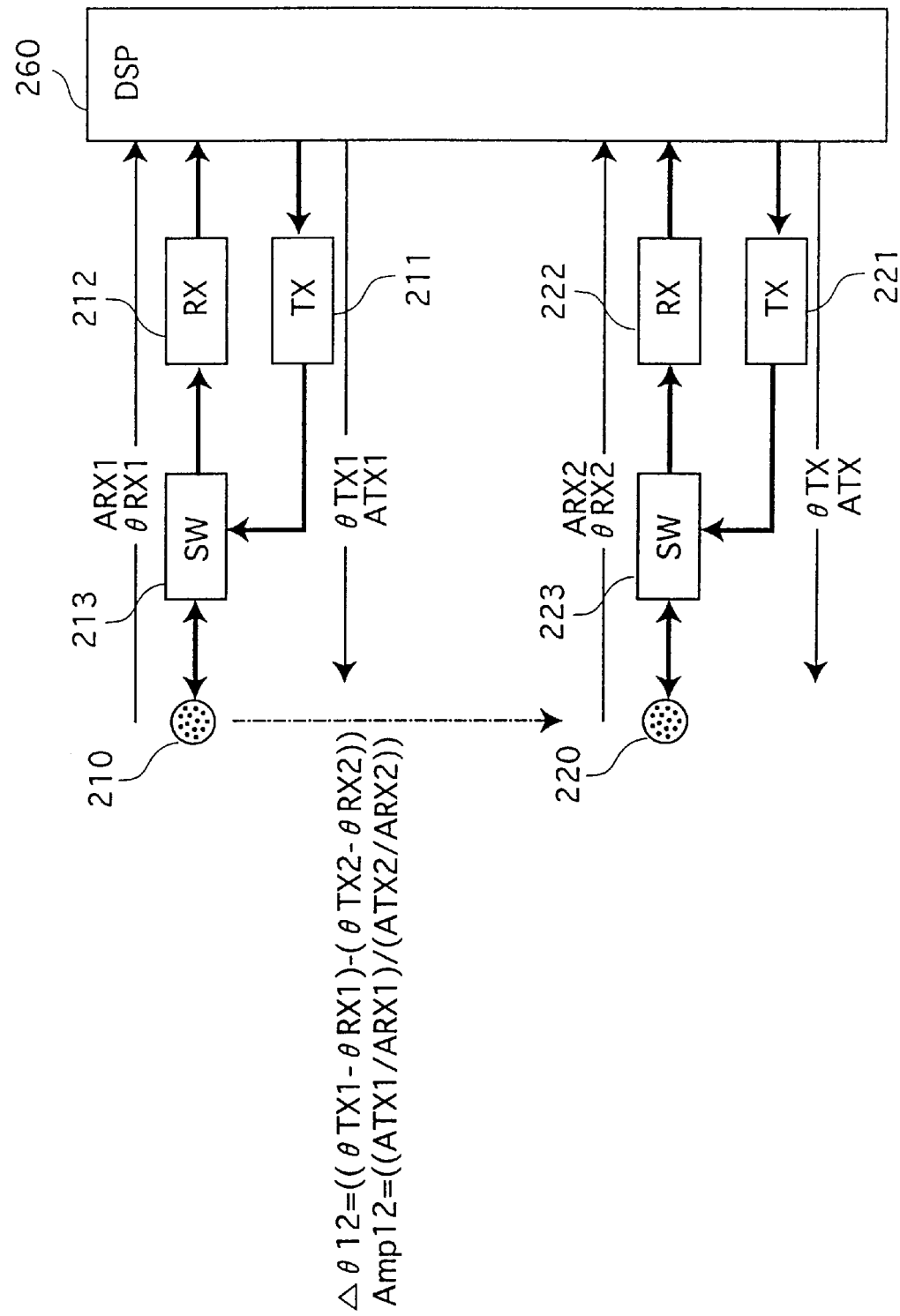
FIG. 11 is an explanatory drawing of the relative correction value.

FIG. 11 is an explanatory drawing of the correction values. In the drawing, θRX1 and ARX1 respectively represent the phase fluctuation amount and the amplitude fluctuation amount produced when a signal from antenna 210 passes through switch 213 and reception circuit 212. θTX1 and ATX1 respectively represent the phase fluctuation amount and the amplitude fluctuation amount produced when a signal passes from transmission circuit 211 and switch 213 to antenna 210. θ RX2 through θRX4 and ARX2 through ARX4 similarly represent phase and amplitude fluctuation amounts within their respective radio units. Δθ12 and Amp12 in the above formulas (20) and (21) respectively represent the relative phase and amplitude fluctuation amounts of radio unit B, with radio unit A serving as the standard.

During normal transmission and within a transmission time slot, weight control unit 238 retrieves weight vectors W1 and W2 from memory 237. Then it outputs these weight vectors to multipliers 215 and 216. The same occurs when a desired signal is transmitted during a calibration process.

Also during normal transmission and within a transmission time slot, correction control unit 239 retrieves correction values Δθ12 and Amp12 from memory 237, then respectively outputting these values to phase shifter 240 and amplifier 241. Additionally, within the calibration process at the time of transmission of the desired signal, correction control unit 239 outputs Δθ to the phase shifter 240 while altering it from −180 to +180 degrees one degree at a time, for instance. And it outputs Amp to the amplifier 241 while gradually altering it (for example, between 0.5 and 2, 0.05 units at a time).

Phase shifter 240 corrects the phase of the transmission signal inputted from multiplier 225 according to the correction value Δθ12 inputted from correction control unit 239.

Amplifier 241 corrects the amplitude of the transmission signal inputted from phase shifter 240 according to the correction value Amp12 inputted from correction control unit 239. Then it outputs the corrected transmission signal to transmission circuit 221.

During normal transmission, modulating circuit 242 modulates the series of bit data to be transmitted, generating a transmission signal (symbol data).

External I/F 250 is a connector connected to the DSP 260 input/output port and the DSP 260 memory (including memories 233 and 237) port. It is installed onto the baseboard of the mobile phone. During the calibration process, this external I/F 250 is connected to the external measurement apparatus and is used for the input/output of the various programs, data, commands, and replies to those commands.

With a mobile phone with the above construction, during normal reception, reception takes place by the formation of an array antenna pattern based on weight vectors calculated in a reception time slot. At the same time, the weight vectors are stored in memory 237. And during the immediately following transmission time slot, transmission takes place by the formation of an array antenna pattern based on the stored weight vectors.

At the time of this transmission, correction control unit 239 uses correction values Δθ12 and Amp12 stored in memory 237 to correct the transmission signal of radio unit B. As a result, it is possible to make corrections that ensure that there will be no deviation in the array antenna pattern at the time of reception and at the time of transmission. In other words, despite a difference in the phase and amplitude fluctuation characteristics of radio unit A and those of radio unit B, directivity of the signal at the time of reception can be made to match the directivity of the signal at the time of transmission by simply correcting the transmission signal of radio unit B. There is no need to correct the transmission signal of radio unit A, which serves as the standard.

Furthermore, by including external I/F 250, if the calibration process is conducted under the control of an external measurement apparatus, measuring the above correction values can be done with ease.

Note that in the case of the above-mentioned mobile phone, since $\Delta\theta12$ and $Amp12$ are the same physical amounts as the weight vectors it is acceptable that the structure of the invention be such that the correction weight vectors that represent $\Delta\theta12$ and $Amp12$ be stored in memory 237, and multipliers are provided in place of phase shifter 240 and amplifier 241. Additionally, one should note that the circuits of correction units 571 through 574 are equivalent to those of phase shifter 240 and amplifier 241, as well as those the multipliers.

Finally, as antenna 210 is a rod antenna and antenna 220 is a chip antenna, when the gain of the two antennas vary, it is acceptable that the above-mentioned $Amp12$ value be a value compensated by an antenna gain compensation value $A\_cmp$, as indicated below.

(21') $Amp12 = A\_cmp* ((ATX1/ARX1)/(ATX2/ARX2))$

3. Measurement Apparatus
3.1 Structure

Figure 12:
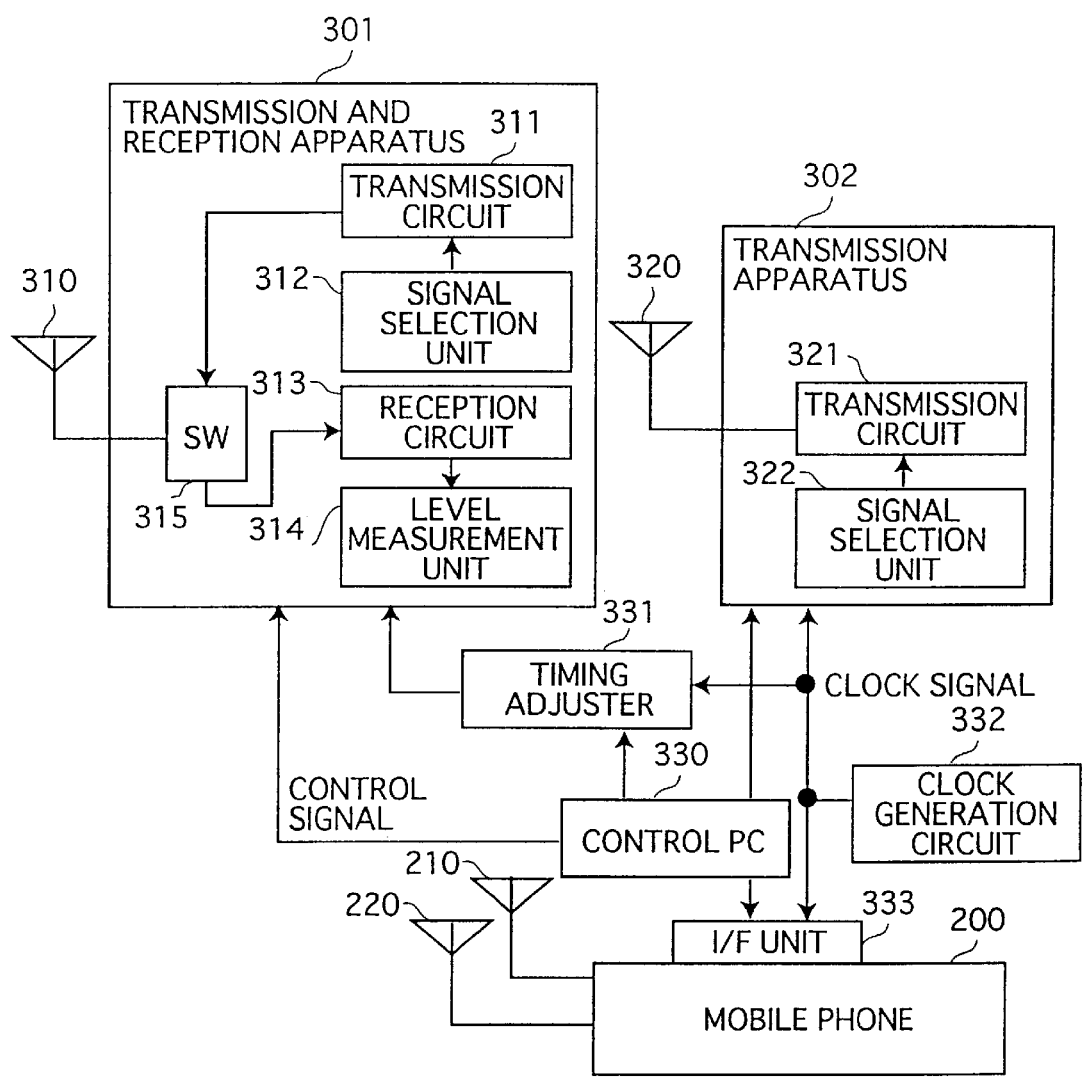
FIG. 12 is a block diagram showing the mobile phone and the structure of the measurement apparatus that measures the correction value of the mobile phone.

FIG. 12 is a block diagram showing the mobile phone and the structure of the measurement apparatus that measures the correction values (in other words, calibrates the values) of the mobile phone.

As shown in the drawing, the measurement apparatus is provided with a transmission and reception apparatus 301, a transmission apparatus 302, a timing adjuster 331, a control PC 330, a clock generation circuit 332, and an I/F unit 333.

In order to fulfill the role of Ant2 indicated in FIGS. 2A and 2B, transmission and reception apparatus 301 is provided with an antenna 310, a transmission circuit 311, a signal selection unit 312, a reception circuit 313, a level measurement unit 314, and a switch 315. With this arrangement, it functions to receive a desired signal that is transmitted from the mobile phone 200 after an interference signal is transmitted.

Via switch 315, transmission circuit 311 transmits from antenna 310 an interference signal that is inputted from signal selection unit 312.

Signal selection unit 312 stores series of symbol data of a plurality of interference signals. Then it selects one of the interference signals and outputs it to transmission circuit 311. This plurality of interference signals includes a) primary interference signals made up of PN codes, and b) secondary interference signals made up of known series of codes, including the fixed bit patterns (SS, PR, UW) that are the same as normal transmission time slots. The selection of interference signals is dependent on commands from control PC 330.

Via antenna 310 and switch 315, reception circuit 313 receives from the mobile phone 200 a transmission signal that directs a null toward transmission and reception apparatus 301.

Level measurement unit 314 measures the reception signal level of the reception signal of reception circuit 313. Then it notifies control PC 330 of the measured reception signal level.

In order to fulfill the role of Ant1 shown in FIGS. 2A and 2B, transmission apparatus 302 transmits the desired signal by being equipped with an antenna 320, a transmission circuit 321, and a signal selection unit 322.

Via switch 325, transmission circuit 321 transmits from antenna 320 a desired signal that is inputted from signal selection unit 322.

Signal selection unit 322 stores series of symbol data of a plurality of desired signals. Then it selects one of the desired signals and outputs it to transmission circuit 321. This plurality of desired signals includes a) primary desired signals made up of PN codes that are orthogonal to the primary interference signal and b) secondary desired signals made up of known series of codes, including the fixed bit patterns (SS, PR, UW) that are the same as normal transmission time slots. The selection of interference signals is dependent on commands from control PC 330.

When signal selection units 312 and 322 respectively select a primary interference signal and a primary desired signal, timing adjuster 331 directly outputs to transmission and reception apparatus 301 the clock signal (symbol clock) inputted from signal selection unit 322. When signal selection units 312 and 322 respectively select a secondary interference signal and a secondary desired signal, timing adjuster 331 outputs to transmission and reception apparatus 301 the clock signal inputted from signal selection unit 322 after, for example, delaying the signal by a 0.5 symbol time. The reason for this delay lies in the fact that both the secondary interference signal and the secondary desired signal include the same fixed bit patterns (SS, PR, UW, etc.). That is, the delay makes it easier to separate out the desired signal occurring in the mobile phone 200. It is not necessary for the timing adjuster 331 to perform a delay when a primary interference signal and primary desired signal are selected, but, for ease of construction, it is acceptable for the timing adjuster 331 to be designed so that the delay takes place.

In like manner to the calibration process shown in FIGS. 2A and 2B, control PC 330 controls transmission and reception apparatus 301, transmission apparatus 302, timing adjuster 331, and mobile phone 200 in order to measure the correction value of radio unit B that uses as a standard radio unit A of mobile phone 200.

Clock generation circuit 332 outputs a clock signal, which indicates symbol timing, to transmission apparatus 302 and timing adjuster 331.

Figure 13:
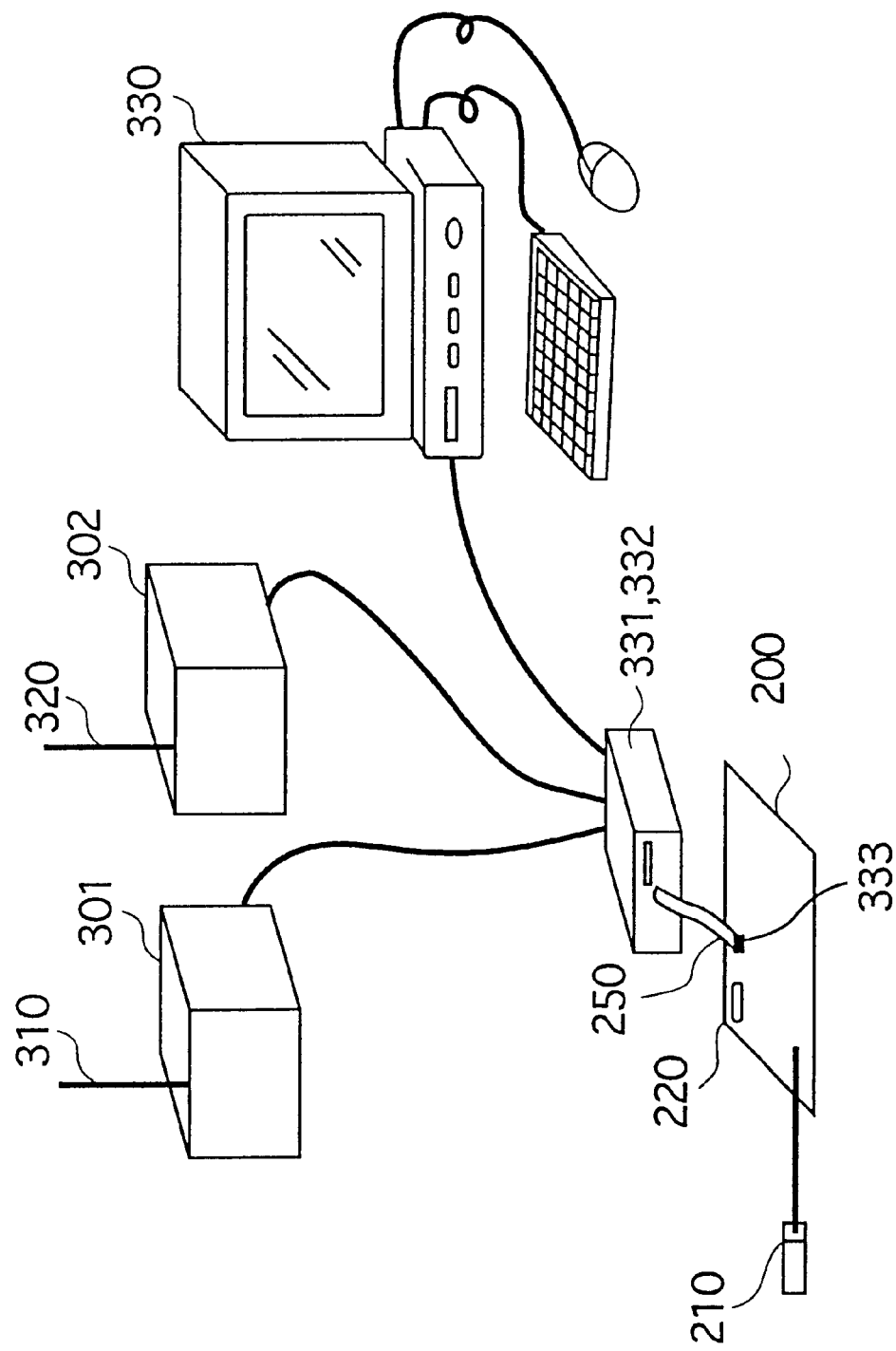
FIG. 13 shows the outer appearance of the measurement apparatus and the mobile phone 200, and it also shows an example of the physical connection between the two.

I/F unit 333 is connected to external I/F 250 that is within mobile phone 200. It serves as an interface for the input/output of commands and data to and from mobile phone 200. FIG. 13 shows an example of the outer appearance of and the physical connections between the measurement apparatus and mobile phone 200. In the drawing, the mobile phone 200 is shown as merely a baseboard without its casing and I/F unit 333 is shown as a connector on the baseboard fitted together with external I/F 250. Additionally, transmission and reception apparatus 301 and transmission apparatus 302 can be constructed from typical signal generators, or they can be constructed by modifying the radio base station or the mobile phone.

Note that it is acceptable that rather than being a connector, external I/F 250 can be a plurality of pads provided on the baseboard. In such a case, I/F unit 333 can be a probe connected to the plurality of pads.

Additionally, at times of calibration, it is desirable that the measurement apparatus and mobile phone shown in FIG. 13 are placed in an electromagnetically shielded anechoic chamber or the like.

3.2. Calibration Process

Figure 14:
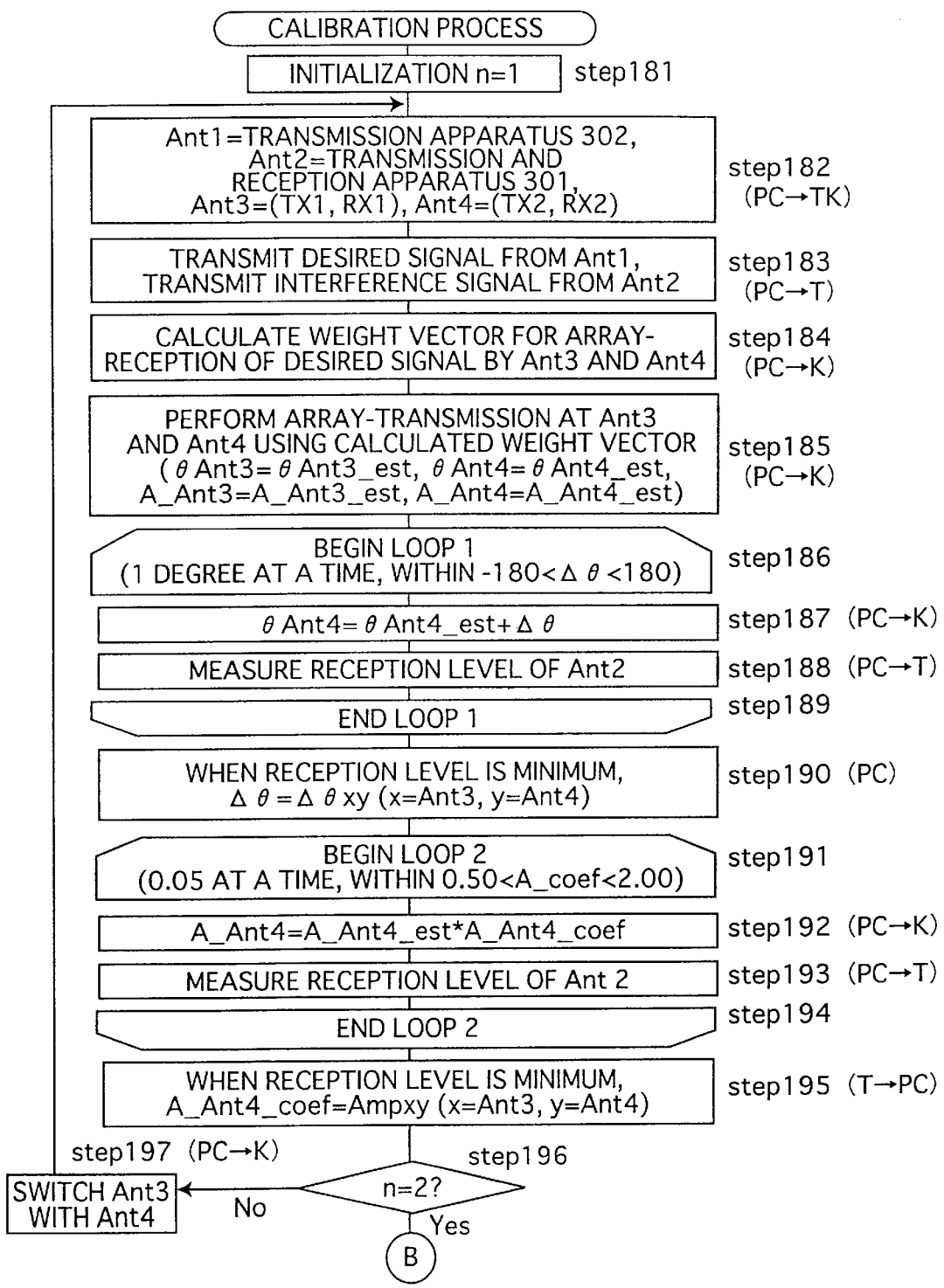
FIG. 14 is a flow chart showing the contents of the calibration process of control PC 330.
Figure 15:
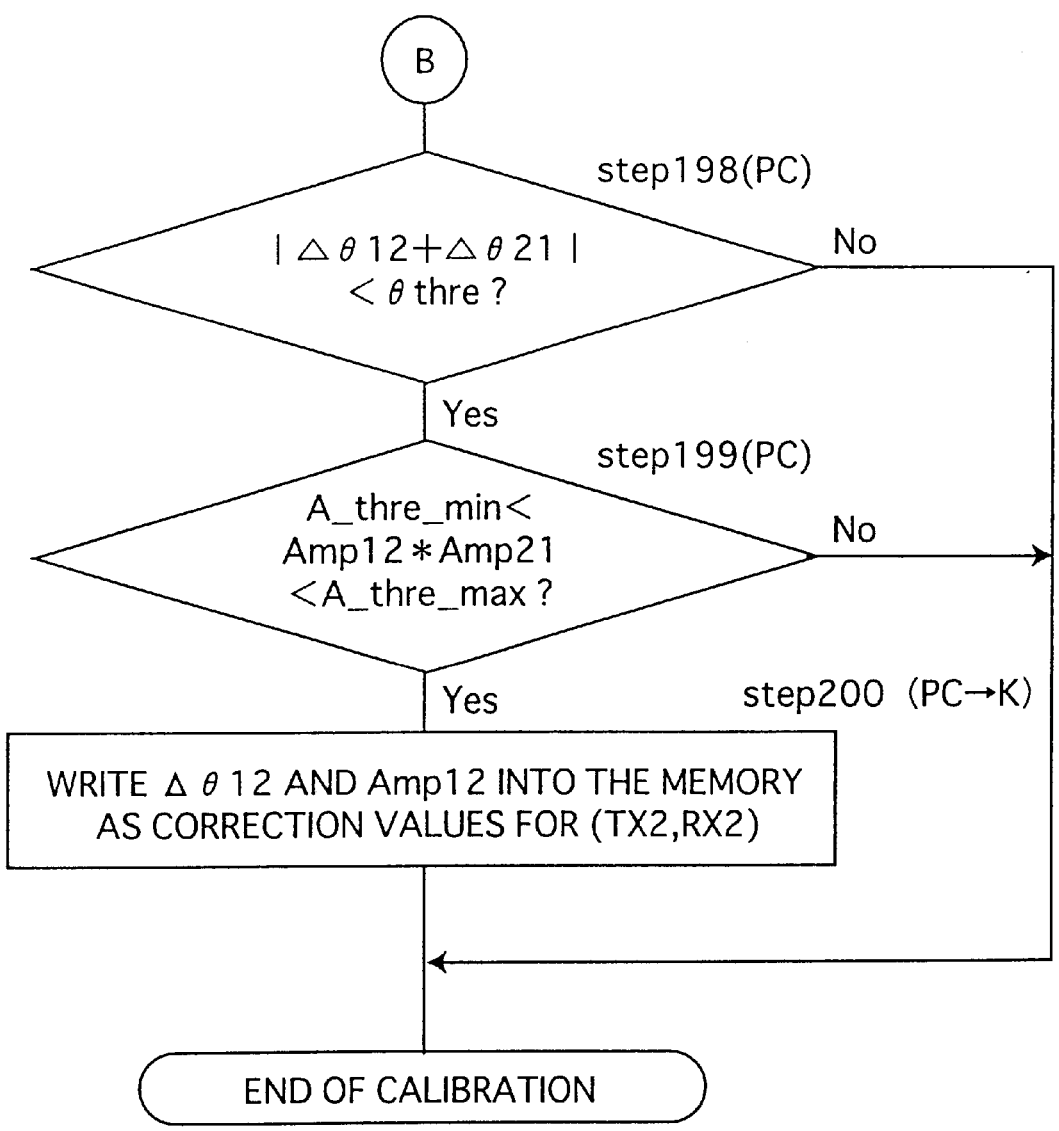
FIG. 15 is a flow chart showing the continuation of the calibration process of control PC 330.

FIGS. 14 and 15 are flowcharts that show the calibration process that takes place under the control of control PC 330. Although these drawings are basically the same in content as FIGS. 8 and 9, the actual unit performing each step varies. In the drawing, (PC→K) indicates the step which is triggered by commands or data that are sent from control PC 330 to mobile phone 200. (PC→T) indicates the step is triggered by commands or data that are sent from control PC 330 to transmission and reception apparatus 301 or transmission apparatus 302. (PC) indicates steps that occur within control PC 330. Finally, n is a variable for the purpose of counting from 1 to 2.

After variable n is initialized (n=1, Step 181), control PC 330 determines that transmission apparatus 302, transmission and reception apparatus 301, radio unit A (TX1, RX1 in drawing), and radio unit B (TX2, RX2 in drawing) will respectively serve as radio units Ant 1 through Ant 4 (Step 182). These correspond to Ant1 through Ant4 in FIGS. 2A and 2B.

Control PC 330 commands Ant1 (transmission apparatus 302) and Ant2 (transmission and reception apparatus 301) to transmit a primary desired signal and a primary interference signal. This causes the primary desired signal waves and primary interference signal waves from transmission apparatus 302 and transmission and reception apparatus 301, respectively, to be transmitted on the same frequency (Step 183). Further, control PC 330 uses Ant3 and Ant4 as a 2-antenna adaptive array apparatus to form array antenna pattern for the desired signals sent from Ant1. That is to say, control PC 330 commands the mobile phone 200 to calculate a weight vector for the purpose of separating out the desired signal from the reception waves that include both desired signals and interference signals in a multiplexed form. This causes the weight calculating unit 236 of mobile phone 200 to calculate a weight vector for the purpose of receiving the primary desired signal (Step 184).

At this juncture, if the weight vectors are not sufficiently converged—that is, if the error e(t) of formula (19) is greater than a certain threshold value—it is acceptable that the mobile phone 200 notify the control PC 330 of this so that it can terminate the calibration process and recommence it from the beginning.

If the weight vectors are sufficiently converged, control PC 330 a) commands that Ant3 and Ant4 are used as a 2-antenna adaptive array apparatus to perform an array transmission of the desired signal by using the calculated weight vector, and b) commands Ant2 (transmission and reception apparatus 301) to receive a desired signal. This leads to the mobile phone 200 forming an array antenna pattern with a null directed toward transmission apparatus 302 and performing an array transmission of the desired signal (Step 185). At this time, the phases and amplitudes of the transmission signals sent to Ant3 and Ant4 after weighting are expressed by the following: θAnt3=θAnt3 est, θAnt4=θAnt4 est, A Ant3=A Ant3 est, and A Ant4=A Ant4 est.

During this array transmission, control PC 330 commands the mobile phone 200 to, while maintaining fixed values for phase θAnt3 and amplitudes A Ant3 and A Ant4, add the phase compensation amount Δθ to the phase amount of the transmission signal being sent from Ant4 while altering the amount Δθ by 1 degree at a time from −180 degrees to +180 degrees (θAnt4=θAnt4 est+Δθ). Then, control PC 330 obtains from transmission and reception apparatus 301 the reception signal measurement results for every Δθ and stores them in its memory. (Steps 186 through 189.) The phase compensation amount Δθ at this time is added to the transmission signal from multiplier 225 by means of correction control unit 239 and phase shifter 240 shown in FIG. 10.

Further, control PC 330 stores up within its memory the reception signal level for each θ, control PC 330 takes the phase compensation amount Δθ corresponding to the minimum reception signal level as Δθ34 (=Δθ12 of FIG. 11) (Step 190).

Furthermore, control PC 330 commands mobile phone 200 to, while maintaining fixed values for phase θAnt3, θAnt4 (=θAnt4 est+Δθ34) and amplitude A Ant3, multiply the amplitude compensation amount Amp coef with the amplitude of the transmission signal of Ant4 while gradually altering that amount by, for example, 0.05 units at a time within a range of 0.5 to 2 (A Ant4=A Ant4 est * Amp coef). Then, control PC 330 a) commands transmission and reception apparatus 301 to measure the reception signal level at Ant2 for every Amp coef, b) obtains these measurement results, and c) stores this information in its internal memory (Steps 191 through 194.) The amplitude compensation amount Amp coef at this time is multiplied by the transmission signal from phase shifter 240 by means of correction control unit 239 and amplifier 241 shown in FIG. 10.

Referring to the reception signal level stored in the memory, Control PC 330 takes the phase compensation amount Amp coef corresponding to the minimum reception signal level as Amp34 (=Amp12 of FIG. 11) (Step 195).

By the above stated steps, the phase and amplitude fluctuation amounts, Δθ12 and Amp12, of Ant4 (radio unit B) relative to Ant3 (radio unit A) within mobile phone 200 are measured.

Further, control PC 330 switches Ant3 with Ant4. That is, it performs the same processes (Steps 183 through 195) with Ant3 functioning as radio unit B and Ant4 functioning as radio unit A (Steps 196 and 197). However, in Steps 187 and 192, the phase shifter 240 and amplifier 241 within the mobile phone 200 do not alter the phase and amplitude. Rather, weight control unit 238 calculates a weight vector in which the above-mentioned Δθ and Amp coef are added to the weight vector W2. Then multiplier 215 uses this calculated weight vector to perform a weighting function.

As a result of this second process the correction values Δθ12 and Amp12 for radio unit A, relative to radio unit B, are measured. These correction values are not used for the mobile phone 200, but they are used, as mentioned below, for determining the correctness of the correction values Δθ12 and Amp12.

That is to say, control PC 330 determines whether the measured-relative phase fluctuation amounts (Δθ12 and Δθ21) and relative amplitude fluctuation amounts (Amp12 and Amp21) are appropriate (Steps 198 and 199). This determination is dependent on whether or not the equations (22) and (23) are satisfied. Other than the fact that only two correction values are used, these equations are the same as (17) and (18).

(22) $|\Delta\theta12+\Delta\theta21|<thre$

(23) $A\ thre\ min < Amp12*Amp21 < A\ thre\ max$

If control PC330 does not satisfy either of these equations, the calibration process should be terminated and recommenced from the beginning. In such an instance, it is preferable that changes be made to the conditions, for example, to the desired signal and the interference signal.

When both equations (17) and (18) are satisfied, control PC 330 commands mobile phone 200 to write the correction values Δθ12 and Amp 12 into memory 237 (Step 200). This results in memory 237 of mobile phone 200 storing the correction values Δθ12 and Amp12.

As explained above, by means of the measurement apparatus, the relative correction values of radio unit B, relative to radio unit A within mobile phone 200, are measured, and the correction values are established within mobile phone 200.

4. Examples of Other Variations of the Invention

The following are examples of variations of the structure of the above-explained embodiment of the present invention.

(1) In the case of the radio base station described above, the relative phase fluctuation amounts and relative amplitude fluctuation amounts for all 4 of the radio units were measured. However, in the calculating of correction values for each radio unit, it is sufficient to measure the relative phase and amplitude fluctuation amounts for all but one of the total number of radio units. For example, it would be sufficient to measure only Case 1 through Case 3 indicated in FIG. 6. The reason for this lies in the fact that the correction values are relative to one of the radio units that serves as a standard, and it is not necessary to correct the radio unit that is serving as the standard.

Additionally, the reason that the earlier-explained embodiment included the measurement of the relative phase and amplitude fluctuation amounts for every radio unit was for the purpose of using equations (17) and (18) to determine the correctness of the phase and amplitude fluctuation amounts.

(2) It is acceptable that the weight vector used in the array transmission from Ant3 and Ant4 in FIG. 2B not be calculated from the array reception indicated in FIG. 2A. For example, it is acceptable to store in the memory the weight vector used in the preceding calibration process and use that stored weight vector; it is acceptable to obtain from an external source a weight vector that has a property that directs a null to Ant2; and it is acceptable to have the weight vector stored in advance. In these cases, it is possible to omit the process of FIG. 2A.

Additionally, in the case of FIG. 2A, it is acceptable to calculate a weight vector that directs a forced null to Ant2 to serve the purpose of a weight vector with a property that directs a null to Ant2. A forced null refers to the directing of a null in a specified direction.

(3) In the description of the embodiment of the present invention, as shown in FIG. 2B, $\Delta\theta 34$ and Amp34 were calculated as $\Delta\theta$ and A Amp, when the reception signal levels in Ant2 are at a minimum. In place of this, or in conjunction with this, it is acceptable to calculate $\Delta\theta 34$ and Amp34 as $\Delta\theta$ and A Amp, when the reception signal levels in Ant1 are at a maximum. This can be done because the array antenna pattern in FIG. 2B is formed so that Ant1 obtains the maximum amount of gain.

(4) Although the calibration processes indicated in FIGS. 8 and 9 include the measurement of the relative phase and amplitude fluctuations of every radio unit, as shown in FIGS. 2A and 2B, it is acceptable to measure the relative phase and amplitude fluctuations of only one or two radio units. For example, in cases such as when correction value retaining unit 570 has already stored the correction values for each radio unit, it will suffice to only measure the phase and amplitude fluctuation amounts needed for the calculation of the correction value of the particular radio unit involved.

(5) It is preferable to periodically perform calibration processes on the earlier-described radio base station. This is because changes can come about in the characteristics differences at the time of transmission and reception depending on the environment in which it is installed and the aging that takes place.

In this case, it is acceptable to perform unit-by-unit comparisons/updates using the phase and amplitude fluctuation amounts for each radio unit stored by the correction value retaining unit 570 and newly measured phase and amplitude fluctuation amounts. If the results of this comparison show a great difference (that is, if the threshold value is surpassed), it is acceptable to have a calibration process performed on all radio units.

(6) The description of the embodiment of the present invention indicates that DSP 50 controls almost all of the calibration processes, but it is acceptable to have the burden shared with control unit 80.

(7) In the description of the embodiment of the present invention, it was assumed that an array transmission from the two radio units Ant3 and Ant4 would be used to direct a null to Ant2. However, it is acceptable for the design to be such that one radio unit performs an independent transmission and another element performs an independent reception in order to directly search for $\theta xy$ and Amp xy as respective representations of the phase and amplitude fluctuation amounts in the signal at the time of reception. In this case, a non-modulating signal or some other known signal should be transmitted from the transmission side to the reception side, then the phase and amplitude fluctuation amounts can be measured from the signal that is inputted into the DSP 50 from the radio unit of the reception side.

(8) As indicated in the description of the embodiment of the present invention, the primary units that provide the inventiveness of the adaptive array apparatus that makes up the radio base station can be found in the running of the programs by DSP 50 provided within the adaptive array apparatus. These programs are installed into PROM, EEPROM, or RAM and can be updated by switching out the ROMs. Via program recording media or network or telephone lines, these programs can also be downloaded into EEPROM or RAM and retrieved by the digital signal processor.

(9) It is acceptable that the mobile phone 200 described in the embodiment of the present invention not be provided correction control unit 239, phase shifter 240 and amplifier 241. Rather, the design can be such that the functions of those units are carried out by weight control unit 238 and multiplier 225. In such case, weight control unit 238 should add correction values $\Delta\theta 12$ and Amp12 to weight vector W2 received from memory 237 to calculate weight vectors. Then, using these calculated weight vectors, multiplier 225 should perform the weighting. This is because the weight vectors and the phases and amplitudes are the equivalent physical amounts to begin with. Also in this case, it is acceptable that either radio unit A or B serves as the standard. Additionally, since the area within the dashed line in FIG. 10 indicates the functions performed by DSP 260, the structure of the embodiment and that of the example described above are essentially the same and can easily be actualized.

(10) In Steps 87 and 88 of FIG. 8 and Steps 187 and 188 of FIG. 14, the structure is such that the successive reception signal levels are measured as the phase and amplitude are altered by certain small increments (the phase, for example, one degree at a time, from −180 to +180 degrees, and the amplitude multiplied by 0.50 to 2.00, 0.05 at a time). However, it is acceptable to measure in large increments (the phase, for example, 90 degrees at a time, and the amplitude multiplied by 0.5 at a time). Then, once the phase and amplitude amounts that result in a minimal reception signal level are found using this method, the measurement of the reception signal level can be done while the phase and amplitude are altered by the small increments (for example, 1 degree and 0.05), but within a more focused range that include the amounts found. This method will reduce time needed for the calibration process.

Additionally, in Steps 87 and 88 of FIG. 8 and Steps 187 and 188 of FIG. 14, it is acceptable for the structure to be such that these steps are terminated at the point when the phase and amplitude that result in a minimum reception signal level is found.

(11) In the described embodiment of the present invention, mobile phone 200 is provided with two radio units. However, it is acceptable for the structure to be such that 3 or more radio units are provided. In such a case, the packaging of the antenna should be a selective assembly of a rod antenna, a pattern antenna, and a chip antenna.

Also, it is acceptable for the measurement apparatus to measure correction values, which are relative to a standard radio unit, for every radio unit other than the one serving as the standard. And the mobile phone can be designed to correct the transmission signal of every radio unit other than the one serving as the standard. With such an arrangement, any of the radio units can serve as the standard for the same reasons as those given in (9). And in the calibration process of FIGS. 14 and 15, measurement of correction values for the radio unit serving as a standard as well as the radio units being measured should take place using Steps 182 through 192. Then, in similar fashion to Steps 98 and 99 of FIG. 9, the correctness of the measured correction values should be determined.

Furthermore, when 4 or more radio units are provided in the structure of the mobile phone, it is possible to not include an external measurement apparatus in the design. Calibration can be done by the mobile phone itself, in the same way that it is done by the radio base station. In this case, the structure should be designed so that the calibration process program can be downloaded via external I/F 250 from the external apparatus to the memory within the mobile phone and erased after measurement is concluded. Also, the design can be such that the above-mentioned program is retained within a memory (stored in ROM) If the program is stored in ROM, calibration processes can be performed based on user operations after delivery of the product, thus reducing the aging that takes place in the radio units.

(12) The embodiment of the present invention is designed with control PC 330 performing the primary functions of the calibration process and controlling mobile phone 200, transmission and reception apparatus 301, and transmission apparatus 302. However, it is acceptable that the calibration process program that is conducted by control PC 330 via external I/F 250 of mobile phone 200 to be downloaded to a memory within mobile phone 200, resulting in mobile phone 200 performing the primary functions of the calibration process.

(13) In the embodiment of the present invention, the input/output of commands and data to and from control PC 330 takes place via external I/F 250. It is acceptable that the input/output of commands, data and programs take place via radio units, and command interpretation and program running be performed by DSP 260. This would allow for a reduction in the cost of parts, since there would be no need for external I/F 250.

INDUSTRIAL APPLICABILITY

The calibration apparatus, the adaptive array apparatus, the calibration method, the program recording medium therefor, and the program therefor, in the present invention make it possible to measure the relative phase fluctuation amounts and the relative amplitude fluctuation amounts at the antennas of the adaptive array as correction values, and are applicable for adaptive array apparatuses at radio base stations for mobile phones, and radio communication devices which perform array-transmissions and array-receptions.

What is claimed is:

1. A calibration apparatus that measures a correct ion value for a radio terminal which, for a purpose of performing radio communication by forming an array antenna pattern, includes at least a first radio unit and a second radio unit, each made up of a transmission unit, a reception unit, and an antenna, the calibration apparatus comprising:

a first antenna;

a second antenna;

a control means for controlling the first radio unit and the second radio unit to perform transmission of signals with an array antenna pattern being formed, using a weight vector by which a directivity is oriented toward the first antenna and a null is directed toward the second antenna; and a measuring means for measuring transfer characteristics that are relative between the first radio unit and the second radio unit on the basis of a signal level of the signals received by either the first antenna or the second antenna.

2. The calibration apparatus of claim 1, wherein the control means controls the second radio unit to fluctuate, during the transmission by the first radio unit and the second radio unit, a phase and an amplitude of the signal transmitted, and the measuring means measures a phase fluctuation amount and an amplitude fluctuation amount as the transfer characteristics on the basis of the phase and the amplitude at such a time when the signal level of the signals received by the second antenna is minimum during the fluctuation.

3. The calibration apparatus of claim 2, further comprising a transmission means for transmitting, on a same frequency, a desired signal from the first antenna, and an interference signal from the second antenna, wherein the control means (i) controls the radio terminal to calculate a weight vector by which the interference signal can be eliminated and the desired signal can be received by the first radio unit and the second radio unit, and then (ii) controls the first radio unit and the second radio unit to perform the transmission of the signals using the weight vector calculated.

4. A calibration apparatus that measures a correction value for an adaptive array apparatus which includes at least a first radio unit and a second radio unit, each made up of an antenna, a transmission unit, and a reception unit, so that identical array antenna patterns are formed at times of transmission and reception, the calibration apparatus comprising:

a control means for controlling the first radio unit and the second radio unit to perform transmission of signals with such an array antenna pattern being formed in which either a null or a directivity is oriented toward a specific direction;

a fluctuation means for controlling the second radio unit to fluctuate during the transmission either a phase or an amplitude of the signal transmitted by the second radio unit;

a measuring means for measuring a signal level of the signals transmitted from the specific direction for each of values of the phase or the amplitude during the fluctuation; and a determining means for determining a correction value of the second radio unit relative to the first radio unit on the basis of either the value of the phase or the value of the amplitude at such a time when the signal level measured is either minimum or maximum.

5. The calibration apparatus of claim 4, further comprising a transmission means for transmitting, on a same frequency, a desired signal and an interference signal from other antennas respectively, wherein the control means (a) controls the adaptive array apparatus to calculate, for each of the signals received by the first radio unit and the second radio unit, a weight coefficient by which the interference signal can be eliminated and the desired signal can be received; and (b) controls the first radio unit and the second radio unit to perform the transmission of the signals with such an array antenna pattern being formed in which a null is directed toward the specific direction being a direction of the antenna that has transmitted the interference signal, by weighting the signals transmitted by the first radio unit and the second radio unit using the weight coefficients calculated, and the measuring means measures the signal level using the antenna that has transmitted the interference signal.

6. An adaptive array apparatus including a plurality of radio units, each made up of a transmission unit, a reception unit, and an antenna, the adaptive array apparatus comprising:

a selecting means for selecting a radio unit among the plurality of radio units; and a control means for controlling the selected radio unit and one of unselected radio units to perform transmission of signals between each other in order to measure transfer characteristics of the selected radio unit on the basis of the signals received.

7. The adaptive array apparatus of claim 6, wherein the selecting means selects another radio unit from the unselected radio units every time the transfer characteristics of the selected radio unit finish being measured; and the control means calculates a correction value for each of the radio units on the basis of the transfer characteristics measured for each of the radio units.

8. The adaptive array apparatus of claim 7, wherein the selecting means selects two radio units, the two selected radio units perform the transmission of the signals with such an array antenna pattern being formed in which a null is directed toward the antenna of one of the unselected radio units, while the two selected radio units fluctuate one or both of a phase and an amplitude at one of the two selected radio units, and the control means determines that the transfer characteristics are one or both of the phase and the amplitude at such a time when a signal level of the signals received by the radio unit toward which a null is directed is minimum during the fluctuation.

9. The adaptive array apparatus of claim 8, wherein the two selected radio units form the array antenna pattern in which a null is directed toward the antenna of the unselected radio unit, by using a weight vector obtained at such a time when the two selected radio units perform an array-reception while eliminating the signal transmitted by one of the unselected radio units.

10. The adaptive array apparatus of claim 7, wherein the selecting means selects two radio units, the two selected radio units perform the transmission of the signals with such an array antenna pattern being formed in which a directivity is oriented toward one of the unselected radio units, while the two selected radio units fluctuate one or both of a phase and an amplitude of the signal transmitted by one of the two selected radio units; and the control means determines that the transfer characteristics are a phase fluctuation amount and an amplitude fluctuation amount at such a time when a signal level of the signals received by the radio unit toward which the directivity is oriented is maximum during the fluctuation.

11. An adaptive array apparatus including a plurality of radio units each made up of a transmission unit, a reception unit, and an antenna, the adaptive array apparatus comprising:

a selecting means for selecting four radio units among the plurality of radio units as a first radio unit, a second radio unit, a third radio unit, and a fourth radio unit; and a control means for (a) controlling the third and the fourth radio units to perform an array-transmission using a weight vector by which a directivity is oriented toward the antenna of the first radio unit and a null is directed toward the antenna of the second radio unit; and (b) measuring transfer characteristics that are relative between the third radio unit and the fourth radio unit on the basis of a signal level of the signals received by either the first radio unit or the second radio unit.

12. The adaptive array apparatus of claim 11, wherein the selecting means repeats selecting four radio units among the plurality of radio units, until each of all the plurality of radio units gets selected once as a fourth radio unit, and the control means calculates a correction value for each of the plurality of radio units using one of the plurality of radio units as a standard of relativity, on the basis of the transfer characteristics measured for each of the radio units.

13. The adaptive array apparatus of claim 11, wherein the control means (a) controls the fourth radio unit to fluctuate a phase of the signal during the array-transmission, and (b) determines a phase fluctuation amount of the fourth radio unit relative to the third radio unit from the phase at such a time when the signal level of the signals received by the second radio unit is minimum during the fluctuation, and (c) controls the fourth radio unit to fluctuate an amplitude of the signal during the array-transmission, and (d) determines an amplitude fluctuation amount of the fourth radio unit relative to the third radio unit from the amplitude at such a time when the signal level of the signals received by the second radio unit is minimum during the fluctuation.

14. An adaptive array apparatus including a plurality of radio units each made up of a transmission unit, a reception unit, and an antenna, the adaptive array apparatus comprising:

a selecting means for selecting four radio units among the plurality of radio units as a first radio unit, a second radio unit, a third radio unit, and a fourth radio unit; and a control means for (a) controlling the first radio unit to transmit a desired signal and the second radio unit to transmit an interference signal, (b) calculating a weight vector by which the interference signal can be eliminated and the desired signal can be array-received by the third radio unit and the fourth radio unit, (c) controlling the third radio unit and the fourth radio unit to perform an array-transmission using the weight vector calculated, and (d) measuring transfer characteristics that are relative between the third radio unit and the fourth radio unit on the basis of a signal level of the signals received either by the first radio unit or the second radio unit.

15. The adaptive array apparatus of claim 14, wherein
the selecting means repeats selecting four radio units among the plurality of radio units, until each of all the plurality of radio units gets selected once as a fourth radio unit; and
the control means calculates a correction value for each of the plurality of radio units on the basis of the transfer characteristics that are relative among the radio units.

16. The adaptive array apparatus of claim 15, wherein
the control means (a) controls the fourth radio unit to fluctuate a phase of the signal during the array-transmission, and (b) determines a phase fluctuation amount of the fourth radio unit relative to the third radio unit from the phase at such a time when the signal level of the signals received by the second radio unit is minimum during the fluctuation, and (c) controls the fourth radio unit to fluctuate an amplitude of the signal during the array-transmission, and (d) determines an amplitude fluctuation amount of the fourth radio unit relative to the third radio unit from the amplitude at such a time when the signal level of the signals received by the second radio unit is minimum during the fluctuation.

17. The adaptive array apparatus of claim 16, wherein
the control means further judges whether the transfer characteristics are correct by checking if either a sum or a product of the transfer characteristics of each of the radio units that are relative fits in a predetermined range.

18. A calibration method used in a calibration apparatus that has a first antenna and a second antenna and calibrates a radio terminal which, for a purpose of performing radio communication by forming an array antenna pattern, includes a first radio unit and a second radio unit, each made up of a transmission unit, a reception unit, and an antenna, the calibration method comprising:
a control step of controlling the first radio unit and the second radio unit to perform an array-transmission of signals with an array antenna pattern being formed, using a weight vector by which a directivity is oriented toward the first antenna and a null is directed toward the second antenna; and
a measuring step of measuring transfer characteristics that are relative between the first radio unit and the second radio unit on the basis of a signal level of the signals received by either the first antenna or the second antenna.

19. The calibration method of claim 18, wherein
the control step controls the second radio unit to fluctuate, during the transmission by the first radio unit and the second radio unit, a phase and an amplitude of the signal transmitted, and
the measuring step measures a phase fluctuation amount and an amplitude fluctuation amount as the transfer characteristics on the basis of the phase and the amplitude at such a time when the signal level of the signals received by the second antenna is minimum during the fluctuation.

20. The calibration method of claim 19, further comprising
a transmission step of transmitting, on a same frequency, a desired signal from the first antenna, and an interference signal from the second antenna, wherein
the measuring step (i) controls the radio terminal to calculate a weight vector by which the interference signal can be eliminated and the desired signal can be received by the first radio unit and the second radio unit, and then (ii) controls the first radio unit and the second radio unit to perform the array-transmission using the weight vector calculated.

21. A calibration method for measuring a correction value for an adaptive array apparatus which includes at least a first radio unit and a second radio unit, each made up of an antenna, a transmission unit, and a reception unit, so that identical array antenna patterns are formed at times of transmission and reception, the calibration method comprising:
a control step of controlling the first radio unit and the second radio unit to perform transmission of signals with such an array antenna pattern being formed in which either a null or a directivity is oriented toward a specific direction;
a fluctuation step of controlling the second radio unit to fluctuate during the transmission either a phase or an amplitude of the signal transmitted by the second radio unit;
a measuring step of measuring a signal level of the signals transmitted from the specific direction for each of values of the phase or the amplitude during the fluctuation; and
a determining step of determining a correction value of the second radio unit relative to the first radio unit on the basis of either the value of the phase or the value of the amplitude at such a time when the signal level measured is either minimum or maximum.

22. The calibration method of claim 21, further comprising
a transmission step of transmitting, on a same frequency, a desired signal and an interference signal from other antennas respectively, wherein
the control step (a) controls the adaptive array apparatus to calculate, for each of the signals received by the first radio unit and the second radio unit, a weight coefficient by which the interference signal can be eliminated and the desired signal can be received; and (b) controls the first radio unit and the second radio unit to perform the transmission of the signals with such an array antenna pattern being formed in which a null is directed toward the specific direction being a direction of the antenna that has transmitted the interference signal, by weighting the signals transmitted by the first radio unit and the second radio unit using the weight coefficients calculated, and
the measuring step measures the signal level using the antenna that has transmitted the interference signal.

23. A calibration method used in an adaptive array apparatus including a plurality of radio units, each made up of a transmission unit, a reception unit, and an antenna, the calibration method comprising:

a selecting step of selecting at least one radio unit among the plurality of radio units; and a measuring step of controlling the selected radio unit and one of unselected radio units to perform transmission of signals between each other in order to measure transfer characteristics of the selected radio unit on the basis of the signals received.

24. The calibration method of claim 23, wherein the selecting step selects another radio unit from the unselected radio units every time the transfer characteristics of the selected radio unit finish being measured; and the measuring step calculates a correction value for each of the radio units on the basis of the transfer characteristics measured for each of the radio units.

25. The calibration method of claim 24, wherein the selecting step selects two radio units, and in the measuring step, the two selected radio units perform the transmission of the signals with such an array antenna pattern being formed in which a null is directed toward the antenna of one of the unselected radio units, while the two selected radio units fluctuate one or both of a phase and an amplitude at one of the two selected radio units, and the measuring step determines that the transfer characteristics are one or both of the phase and the amplitude at such a time when a signal level of the signals received by the radio unit toward which a null is directed is minimum during the fluctuation.

26. The calibration method of claim 25, wherein in the measuring step, the two selected radio units form the array antenna pattern in which a null is directed toward the antenna of the unselected radio unit, by using a weight vector obtained at such a time when the two selected radio units perform an array-reception while eliminating the signal transmitted by one of the unselected radio units.

27. The calibration method of claim 24, wherein the selecting step selects two radio units, the two selected radio units perform the transmission of the signals with such an array antenna pattern being formed in which a directivity is oriented toward one of the unselected radio units, while the two selected radio units fluctuate one or both of a phase and an amplitude of the signal transmitted by one of the two selected radio units; and the measuring step determines that the transfer characteristics are a phase fluctuation amount and an amplitude fluctuation amount at such a time when a signal level of the signals received by the radio unit toward which the directivity is oriented is maximum during the fluctuation.

28. A calibration method used in an adaptive array apparatus including a plurality of radio units each made up of a transmission unit, a reception unit, and an antenna, the calibration method comprising:

a selecting step of selecting four radio units among the plurality of radio units as a first radio unit, a second radio unit, a third radio unit, and a fourth radio unit; and a measuring step of (a) controlling the third and the fourth radio units to perform an array-transmission using a weight vector by which a directivity is oriented toward the antenna of the first radio unit and a null is directed toward the antenna of the second radio unit; and (b) measuring transfer characteristics that are relative between the third radio unit and the fourth radio unit on the basis of a signal level of the signals received by either the first radio unit or the second radio unit.

29. The calibration method of claim 28, wherein the selecting step repeats selecting four radio units among the plurality of radio units, until each of all the plurality of radio units gets selected once as a fourth radio unit, and the measuring step calculates a correction value for each of the plurality of radio units using one of the plurality of radio units as a standard of relativity, on the basis of the transfer characteristics measured for each of the radio units.

30. The calibration method of claim 28, wherein the measuring step (a) controls the fourth radio unit to fluctuate a phase of the signal during the array-transmission, and (b) determines a phase fluctuation amount of the fourth radio unit relative to the third radio unit from the phase at such a time when the signal level of the signals received by the second radio unit is minimum during the fluctuation, and (c) controls the fourth radio unit to fluctuate an amplitude of the signal during the array-transmission, and (d) determines an amplitude fluctuation amount of the fourth radio unit relative to the third radio unit from the amplitude at such a time when the signal level of the signals received by the second radio unit is minimum during the fluctuation.

31. A calibration method used in an adaptive array apparatus including a plurality of radio units each made up of a transmission unit, a reception unit, and an antenna, the calibration method comprising:

a selecting step of selecting four radio units among the plurality of radio units as a first radio unit, a second radio unit, a third radio unit, and a fourth radio unit; and a measuring step of (a) controlling the first radio unit to transmit a desired signal and the second radio unit to transmit an interference signal, (b) calculating a weight vector by which the interference signal can be eliminated and the desired signal can be array-received by the third radio unit and the fourth radio unit, (c) controlling the third radio unit and the fourth radio unit to perform an array-transmission using the weight vector calculated, and (d) measuring transfer characteristics that are relative between the third radio unit and the fourth radio unit on the basis of a signal level of the signals received either by the first radio unit or the second radio unit.

32. The calibration method of claim 31, wherein the selecting step repeats selecting four radio units among the plurality of radio units, until each of all the plurality of radio units gets selected once as a fourth radio unit; and the measuring step calculates a correction value for each of the plurality of radio units on the basis of the transfer characteristics that are relative among the radio units.

33. The calibration method of claim 32, wherein the measuring step (a) controls the fourth radio unit to fluctuate a phase of the signal during the array-transmission, and (b) determines a phase fluctuation amount of the fourth radio unit relative to the third radio unit from the phase at such a time when the signal level of the signals received by the second radio unit is minimum during the fluctuation, and (c) controls the fourth radio unit to fluctuate an amplitude of the signal during the array-transmission, and (d) determines an amplitude fluctuation amount of the fourth radio unit relative to the third radio unit from the amplitude at such a time when the signal level of the signals received by the second radio unit is minimum during the fluctuation.

34. The calibration method of claim 33, wherein the measuring step further judges whether the transfer characteristics are correct by checking if either a sum or a product of the transfer characteristics of each of the radio units that are relative fits in a predetermined range.

35. A program to be executed by a computer in a calibration apparatus that has a first antenna and a second antenna and calibrates a radio terminal which, for a purpose of performing radio communication by forming an array antenna pattern, includes a first radio unit and a second radio unit, each made up of a transmission unit, a reception unit, and an antenna, the program instructing the computer to execute:

a control step of controlling the first radio unit and the second radio unit to perform an array-transmission of signals with an array antenna pattern being formed, using a weight vector by which a directivity is oriented toward the first antenna and a null is directed toward the second antenna; and a measuring step of measuring transfer characteristics that are relative between the first radio unit and the second radio unit on the basis of a signal level of the signals received by either the first antenna or the second antenna.

36. The program of claim 35, wherein the control step controls the second radio unit to fluctuate, during the transmission by the first radio unit and the second radio unit, a phase and an amplitude of the signal transmitted, and the measuring step measures a phase fluctuation amount and an amplitude fluctuation amount as the transfer characteristics on the basis of the phase and the amplitude at such a time when the signal level of the signals received by the second antenna is minimum during the fluctuation.

37. The program of claim 36 further instructing the computer to execute a transmission step of transmitting, on a same frequency, a desired signal from the first antenna, and an interference signal from the second antenna, wherein the measuring step (i) controls the radio terminal to calculate a weight vector by which the interference signal can be eliminated and the desired signal can be received by the first radio unit and the second radio unit, and then (ii) controls the first radio unit and the second radio unit to perform the array-transmission using the weight vector calculated.

38. A program executed by a computer in a calibration apparatus that measures a correction value for an adaptive array apparatus which includes at least a first radio unit and a second radio unit, each made up of an antenna, a transmission unit, and a reception unit, so that identical array antenna patterns are formed at times of transmission and reception, the program instructing the computer to execute:

a control step of controlling the first radio unit and the second radio unit to perform transmission of signals with such an array antenna pattern being formed in which either a null or a directivity is oriented toward a specific direction;

a fluctuation step of controlling the second radio unit to fluctuate during the transmission either a phase or an amplitude of the signal transmitted by the second radio unit;

a measuring step of measuring a signal level of the signals transmitted from the specific direction for each of values of the phase or the amplitude during the fluctuation; and a determining step of determining a correction value of the second radio unit relative to the first radio unit on the basis of either the value of the phase or the value of the amplitude at such a time when the signal level measured is either minimum or maximum.

39. The program of claim 38, further comprising a transmission step of transmitting, on a same frequency, a desired signal and an interference signal from other antennas respectively, wherein the control step (a) controls the adaptive array apparatus to calculate, for each of the signals received by the first radio unit and the second radio unit, a weight coefficient by which the interference signal can be eliminated and the desired signal can be received; and (b) controls the first radio unit and the second radio unit to perform the transmission of the signals with such an array antenna pattern being formed in which a null is directed toward the specific direction being a direction of the antenna that has transmitted the interference signal, by weighting the signals transmitted by the first radio unit and the second radio unit using the weight coefficients calculated, and the measuring step measures the signal level using the antenna that has transmitted the interference signal.

40. A program executed by a computer in an adaptive array apparatus including a plurality of radio units, each made up of a transmission unit, a reception unit, and an antenna, the program instructing the computer to execute:

a selecting step of selecting at least one radio unit among the plurality of radio units; and a measuring step of controlling the selected radio unit and one of unselected radio units to perform transmission of signals between each other in order to measure transfer characteristics of the selected radio unit on the basis of the signals received.

41. The program of claim 40, wherein the selecting step selects another radio unit from the unselected radio units every time the transfer characteristics of the selected radio unit finish being measured; and the measuring step calculates a correction value for each of the radio units on the basis of the transfer characteristics measured for each of the radio units.

42. The program of claim 41, wherein the selecting step selects two radio units, and in the measuring step, the two selected radio units perform the transmission of the signals with such an array antenna pattern being formed in which a null is directed toward the antenna of one of the unselected radio units, while the two selected radio units fluctuate one or both of a phase and an amplitude at one of the two selected radio units, and the measuring step determines that the transfer characteristics are one or both of the phase and the amplitude at such a time when a signal level of the signals received by the radio unit toward which a null is directed is minimum during the fluctuation.

43. The program of claim 42, wherein in the measuring step, the two selected radio units form the array antenna pattern in which a null is directed toward the antenna of the unselected radio unit, by using a weight vector obtained at such a time when the two selected radio units perform an array-reception while eliminating the signal transmitted by one of the unselected radio units.

44. The program of claim 41, wherein the selecting step selects two radio units, the two selected radio units perform the transmission of the signals with such an array antenna pattern being formed in which a directivity is oriented toward one of the unselected radio units, while the two selected radio units fluctuate one or both of a phase and an amplitude of the signal transmitted by one of the two selected radio units; and the measuring step determines that the transfer characteristics are a phase fluctuation amount and an amplitude fluctuation amount at such a time when a signal level of the signals received by the radio unit toward which the directivity is oriented is maximum during the fluctuation.

45. A program executed by a computer in an adaptive array apparatus including a plurality of radio units each made up of a transmission unit, a reception unit, and an antenna, the program instructing the computer to execute:

a selecting step of selecting four radio units among the plurality of radio units as a first radio unit, a second radio unit, a third radio unit, and a fourth radio unit; and a measuring step of (a) controlling the third and the fourth radio units to perform an array-transmission using a weight vector by which a directivity is oriented toward the antenna of the first radio unit and a null is directed toward the antenna of the second radio unit; and (b) measuring transfer characteristics that are relative between the third radio unit and the fourth radio unit on the basis of a signal level of the signals received by either the first radio unit or the second radio unit.

46. The program of claim 45, wherein the selecting step repeats selecting four radio units among the plurality of radio units, until each of all the plurality of radio units gets selected once as a fourth radio unit, and the measuring step calculates a correction value for each of the plurality of radio units using one of the plurality of radio units as a standard of relativity, on the basis of the transfer characteristics measured for each of the radio units.

47. The program of claim 45, wherein the measuring step (a) controls the fourth radio unit to fluctuate a phase of the signal during the array-transmission, and (b) determines a phase fluctuation amount of the fourth radio unit relative to the third radio unit from the phase at such a time when the signal level of the signals received by the second radio unit is minimum during the fluctuation, and (c) controls the fourth radio unit to fluctuate an amplitude of the signal during the array-transmission, and (d) determines an amplitude fluctuation amount of the fourth radio unit relative to the third radio unit from the amplitude at such a time when the signal level of the signals received by the second radio unit is minimum during the fluctuation.

48. A program executed by a computer in an adaptive array apparatus including a plurality of radio units each made up of a transmission unit, a reception unit, and an antenna, the program instructing the computer to execute:

a selecting step of selecting four radio units among the plurality of radio units as a first radio unit, a second radio unit, a third radio unit, and a fourth radio unit; and a measuring step of (a) controlling the first radio unit to transmit a desired signal and the second radio unit to transmit an interference signal, (b) calculating a weight vector by which the interference signal can be eliminated and the desired signal can be array-received by the third radio unit and the fourth radio unit, (c) controlling the third radio unit and the fourth radio unit to per form an array-transmission using the weight vector calculated, and (d) measuring transfer characteristics that are relative between the third radio unit and the fourth radio unit on the basis of a signal level of the signals received either by the first radio unit or the second radio unit.

49. The program of claim 48, wherein the selecting step repeats selecting four radio units among the plurality of radio units, until each of all the plurality of radio units gets selected once as a fourth radio unit; and the measuring step calculates a correction value for each of the plurality of radio units on the basis of the transfer characteristics that are relative among the radio units.

50. The program of claim 49, wherein the measuring step (a) controls the fourth radio unit to fluctuate a phase of the signal during the array-transmission, and (b) determines a phase fluctuation amount of the fourth radio unit relative to the third radio unit from the phase at such a time when the signal level of the signals received by the second radio unit is minimum during the fluctuation, and (c) controls the fourth radio unit to fluctuate an amplitude of the signal during the array-transmission, and (d) determines an amplitude fluctuation amount of the fourth radio unit relative to the third radio unit from the amplitude at such a time when the signal level of the signals received by the second radio unit is minimum during the fluctuation.

51. The program of claim 50, wherein the measuring step further judges whether the transfer characteristics are correct by checking if either a sum or a product of the transfer characteristics of each of the radio units that are relative fits in a predetermined range.

52. A program recording medium that stores therein a computer-readable program to be executed by a computer in a calibration apparatus that has a first antenna and a second antenna and calibrates a radio terminal which, for a purpose of performing radio communication by forming an array antenna pattern, includes a first radio unit and a second radio unit, each made up of a transmission unit, a reception unit, and an antenna, the computer-readable program instructing the computer to execute:

a control step of controlling the first radio unit and the second radio unit to perform an array-transmission of signals with an array antenna pattern being formed, using a weight vector by which a directivity is oriented toward the first antenna and a null is directed toward the second antenna; and a measuring step of measuring transfer characteristics that are relative between the first radio unit and the second radio unit on the basis of a signal level of the signals received by either the first antenna or the second antenna.

* * * * *